(12) United States Patent
Feibelman et al.

(10) Patent No.: US 9,480,349 B2
(45) Date of Patent: Nov. 1, 2016

(54) ANTI-THEFT RING ASSEMBLY AND METHOD OF USING THE SAME

(71) Applicant: R&J Manufacturing Company, Johnston, RI (US)

(72) Inventors: Jeffrey A. Feibelman, Providence, RI (US); Andrew S. Feldman, Duxbury, MA (US); David W. Brown, Cumberland, RI (US)

(73) Assignee: R&J Manufacturing Company, Johnston, RI (US)

( * ) Notice: Subject to any disclaimer, the term of this patent is extended or adjusted under 35 U.S.C. 154(b) by 163 days.

(21) Appl. No.: 14/867,852

(22) Filed: Sep. 28, 2015

(65) Prior Publication Data

US 2016/0015188 A1    Jan. 21, 2016

Related U.S. Application Data

(63) Continuation of application No. 14/089,697, filed on Nov. 25, 2013, now Pat. No. 9,144,274, which is a continuation of application No. 13/052,072, filed on Mar. 19, 2011, now Pat. No. 8,590,699.

(51) Int. Cl.

| | |
|---|---|
| *B65D 85/02* | (2006.01) |
| *A47F 7/024* | (2006.01) |
| *G09F 3/03* | (2006.01) |
| *A44C 19/00* | (2006.01) |
| *E05B 73/00* | (2006.01) |
| *F16M 13/02* | (2006.01) |

(52) U.S. Cl.
CPC .............. *A47F 7/024* (2013.01); *A44C 19/00* (2013.01); *E05B 73/0005* (2013.01); *E05B 73/0041* (2013.01); *E05B 73/0064* (2013.01); *F16M 13/02* (2013.01); *G09F 3/037* (2013.01); *Y10T 24/44222* (2015.01); *Y10T 29/49826* (2015.01); *Y10T 70/40* (2015.04); *Y10T 70/5009* (2015.04)

(58) Field of Classification Search
USPC .................................................. 206/566, 6.1
See application file for complete search history.

(56) References Cited

U.S. PATENT DOCUMENTS

| | | | |
|---|---|---|---|
| 702,853 A | 6/1902 | Angell | |
| 3,197,166 A * | 7/1965 | Sandler | A47F 7/02 206/565 |
| 3,211,408 A | 10/1965 | Schaefer | |
| 4,300,674 A | 11/1981 | Davet | |
| 5,358,099 A * | 10/1994 | Tavone | A47F 7/03 206/6.1 |
| 5,535,878 A * | 7/1996 | Reed | A47F 7/02 206/303 |
| 5,720,498 A | 2/1998 | McAuley et al. | |

(Continued)

FOREIGN PATENT DOCUMENTS

EP        1031305 A2    8/2000

*Primary Examiner* — Jacob K Ackun
(74) *Attorney, Agent, or Firm* — McInnes & McLane, LLP

(57) ABSTRACT

An anti-theft assembly for deterring theft of a ring is provided. The anti-theft assembly includes a base that can be used to support an electronic article surveillance marker; a product engagement member including a support member that supports the ring during use and a locking member that secures the support member to the base; and an attachment member for securing the ring to the support member. In one embodiment, the support member and the locking member are a single, unitary member. In another embodiment, the support member and the locking member are separate members. Once assembled, upon applying a twisting force to the ring the engagement member rotates within the opening so that the attachment member is not broken.

21 Claims, 32 Drawing Sheets

(56) References Cited

U.S. PATENT DOCUMENTS

| | | |
|---|---|---|
| 6,006,899 A | 12/1999 | McAuley et al. |
| 6,199,309 B1 | 3/2001 | Markarian |
| 6,209,242 B1 | 4/2001 | Marshall |
| 7,377,136 B1 | 5/2008 | DeMartinis et al. |
| 7,537,109 B1 | 5/2009 | Shevick |
| 7,714,721 B1 | 5/2010 | Feibelman et al. |
| 2009/0007614 A1 | 1/2009 | Armstrong et al. |
| 2012/0255331 A1 | 10/2012 | Markarian |

* cited by examiner

ANTI-THEFT RING ASSEMBLY AND METHOD OF USING THE SAME

CROSS-REFERENCE TO RELATED APPLICATIONS

This application is a continuation of U.S. application Ser. No. 14/089,697, filed Nov. 25, 2013, entitled "Anti-Theft Ring Assembly and Method of Using the Same," and which is a continuation of U.S. application Ser. No. 13/052,072, filed Mar. 19, 2011, entitled "Anti-Theft Ring Assembly and Method of Using the Same," the entire contents of the above-identified applications being incorporated herein by reference in their entirety.

TECHNICAL FIELD

This invention relates generally to an anti-theft assembly for use with a ring and, more specifically, to an anti-theft ring assembly that rotates when a twisting or rotational force is applied in order to prevent breakage of the assembly.

BACKGROUND

It is well known in the art of theft deterrence to use electronic article surveillance (EAS) sensors in order to discourage the theft of consumer products. In use, EAS sensors trigger an alarm if not detached or disarmed before the product is removed from the store. For many products, electronic sensors have been very effective in deterring theft. However, such sensors can be difficult to attach to certain products, for example jewelry, and can often be easily removed from such items even when attached. One higher price item that is difficult to effectively attach an electronic sensor to is a ring. It can be difficult to attach sensors to the band of a ring because if the sensors are overly rigid or cumbersome they can limit the customer's ability to try on the ring before purchasing. However, if the tag is easily removed it will not serve as a deterrent. Thus, tags to prevent theft are often attached to rings by using a thin, yet flexible, tear resistant plastic strap.

One such tag is disclosed in U.S. Pat. No. 5,720,498. In the '498 patent the anti-theft tag includes an elongated housing that is attached to the ring by a tear resistant strap that is secured to an outer surface of the tag by a pressure sensitive adhesive. The tag is inserted within a ring display system that includes slots for receiving the body of the anti-theft tag. While generally effective, attaching the strap to the outside of a tag may allow a consumer to tamper with the attachment of the strap in an attempt to remove it.

Another such tag is U.S. Pat. No. 7,714,721 which is issued to the assignee of the present application. In the '721 patent the anti-theft tag includes an elongated housing for accommodating an EAS marker, a product support member that locks into the housing and which supports the ring, and a flexible, tear resistant strap for securing the ring to the support member, with the strap being disposed at least partially within the housing during use. In use, the tear resistant strap extends over the ring shank and the ends of the strap are received within the cavity of the housing in order to protect the strap from unauthorized removal by a consumer.

SUMMARY

Although the aforementioned tags provide a level of security against theft of the ring, it has been discovered that applying a sufficient torque can break the straps that attach the ring to the housing. For example, in prior art ring tags the housing can be held and the ring rotated or twisted until the strap breaks.

The anti-theft ring assembly of the present application includes a base that can be used to support an EAS marker, a product engagement member including a support member that supports the ring during use and a locking member that secures the support member to the base, and an attachment member for securing the ring to the support member. The product support member and locking member may be separate components, or may be formed as a single, unitary member. The base may be a card that includes an opening for receiving a portion of the support member there through. In one embodiment, the support member has a curved or arcuate construction for supporting a circular shank portion of the ring and the attachment member is an adjustable cable tie.

In use, the product engagement member is inserted at least partially through the opening in the card. In one embodiment, the product engagement member includes a separate support member and locking member. In this embodiment, the support member includes a pair of legs that are inserted within the opening from a first side of the card during assembly. A portion of the support member remains adjacent the first side of the card, while the legs extend through the opening and are positioned adjacent a second side of the card, opposite the first side. The locking member is then inserted over the legs of the support member from a second side of the card until the locking member is secured in place over the legs of the support member. The ring is then placed on the support member and a cable tie is inserted through an opening in the locking member, through the opening in the card, around a shank portion of the ring, back through the opening in the card, and through a second opening in the locking member. The tie is then secured to itself, selectively tightened, and cut, as is known in the art.

In another embodiment, the support member and locking member are formed as a single, unitary component. In one embodiment, the locking member includes legs that are inserted through the opening and are positioned adjacent a second side of the card, opposite the first side. The ring is then placed on the support member and a tie is inserted through an opening in the support member, around a shank portion of the ring, and is then secured to itself. The tie is then selectively tightened and cut, as is known in the art. In another unitary embodiment, after the ring is placed on the support member, the tie is inserted through an opening in the locking member, through the opening in the card, around a shank portion of the ring, back through the opening in the card, and through a second opening in the locking member. The tie is then secured to itself, selectively tightened, and cut, as is known in the art.

In any of the embodiments, once the ring is secured to the support member, it is sufficiently difficult to remove the ring from the card without cutting the attachment member so as to discourage theft of the ring by a consumer. If the consumer attempts to break the attachment member by twisting the ring, it is extremely difficult because the engagement member is difficult to grasp due to its small size. If the ring itself is twisted, the engagement member likewise twists within the opening, such that insufficient torque is applied to the attachment member to break it.

The anti-theft ring assembly described herein is tamper resistant, even when a consumer rotates or twists the ring, thus discouraging unauthorized removal of the ring. The anti-theft ring assembly also does not improperly interfere with a consumer trying on the ring, is readily attached to the ring and is aesthetically pleasing. The features of the anti-theft ring assembly as described herein may be used with any of a variety of rings, and may be supported on a variety of display devices as discussed below.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF THE ILLUSTRATIVE EMBODIMENTS

Figure 1:
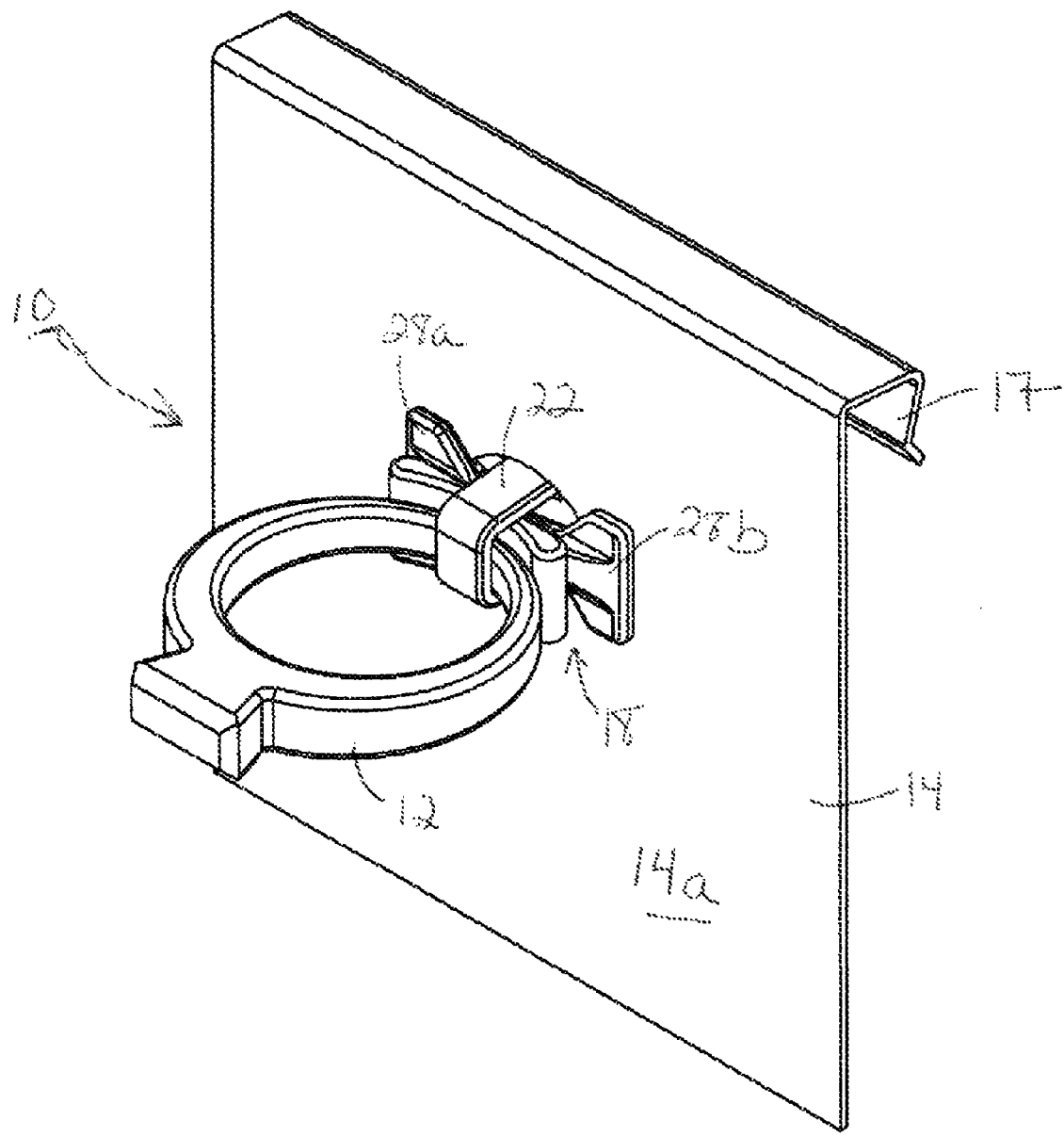
FIG. 1 is a front, perspective view of a first embodiment of an anti-theft ring assembly according to the present disclosure.
Figure 2:
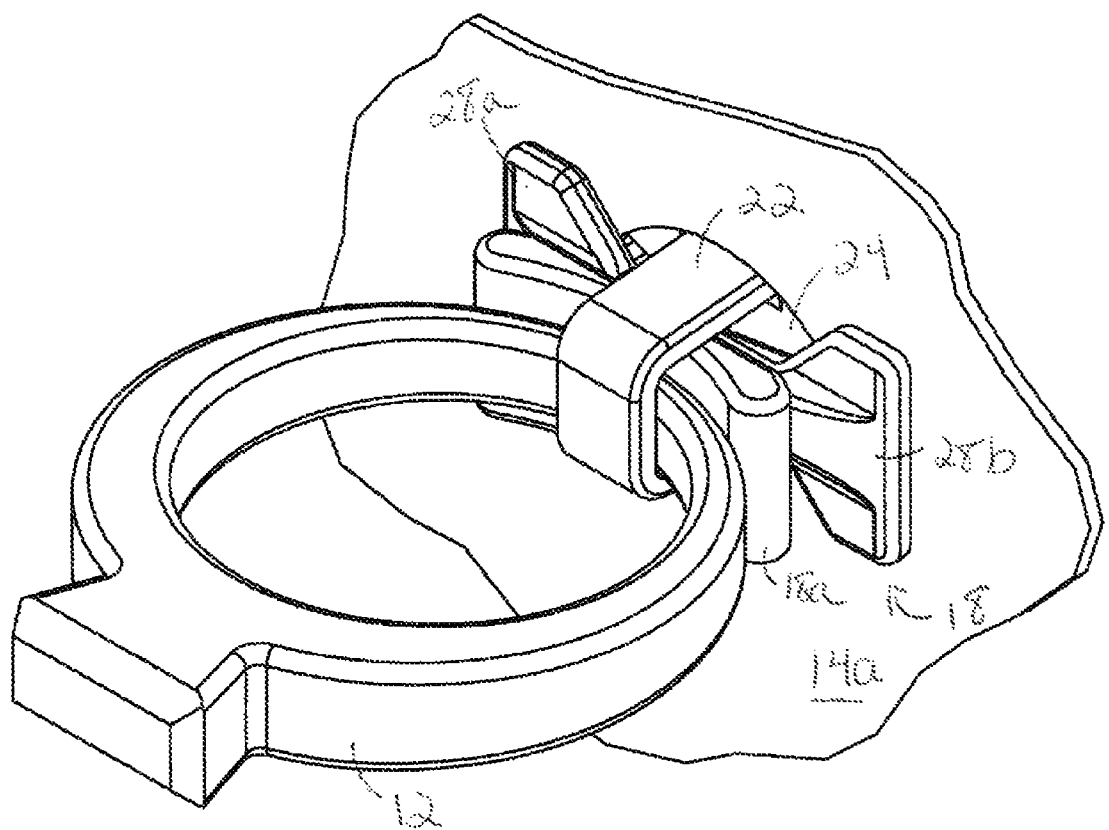
FIG. 2 is an enlarged, front perspective view of the support member of the anti-theft ring assembly of FIG. 1.

The embodiments disclosed herein relate to an anti-theft assembly for use with a ring. As used herein, the term "ring" refers to any jewelry item having a generally circular shank, including but not limited to finger rings, toe rings and bellybutton rings. As also used herein, the term "electronic article surveillance" tag or marker refers to any conventional electronic article surveillance (EAS) sensor that triggers an alarm if not detached or disarmed before the product is removed from a designated area, such as a store.

Referring initially to FIGS. 1-6, an exemplary first embodiment of an anti-theft ring assembly 10 used to deter theft of a ring 12 is illustrated. The anti-theft ring assembly 10 includes a base 14 that can be used to support an EAS marker 15; a product engagement member 16 including a support member 18 that supports the ring 12 during use and a locking member 20 that secures the support member 18 to the base 14; and an attachment member 22 for securing the ring 12 to the support member 18.

Figure 3:
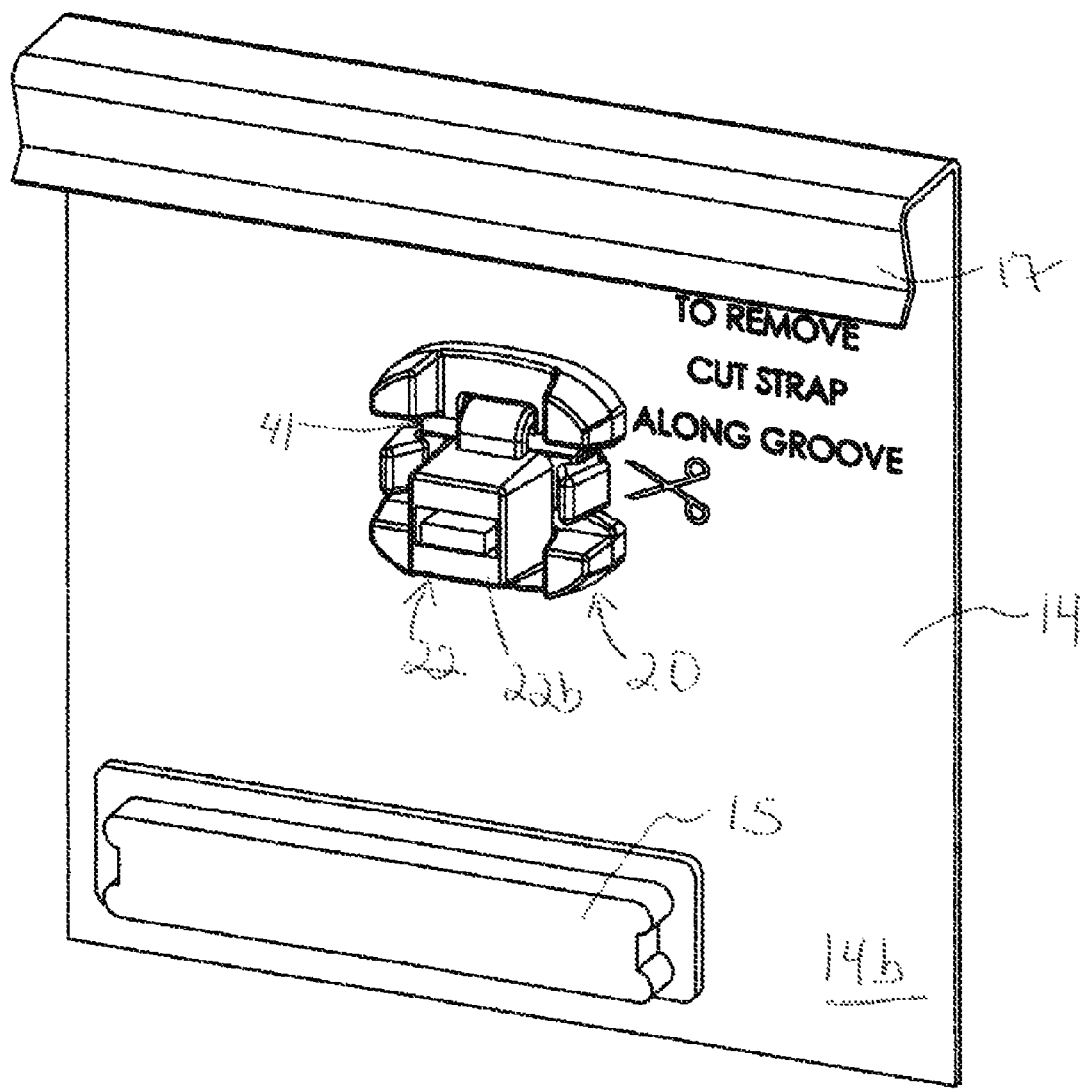
FIG. 3 is a rear, perspective view of the anti-theft ring assembly of FIG. 1.

In the present embodiment, the base 14 may be a card, which can be used with a card display rack (not shown). Card 14 includes an opening 24 sized to receive a portion of the engagement member 16 there through. As illustrated best in FIGS. 6 and 8, in the present embodiment the opening 24 has a generally circular shape with a pair of notches 24a, 24b on either side for receiving corresponding legs 26a, 26b of support member 18 there through, as described in greater detail below. Opening 24 may, alternately have other shapes, as would be known to those of skill in the art. However, the opening should be shaped and sized so that the engagement member can be inserted therein and rotate freely within the opening once fully assembled. Card 14 is substantially planar and includes a first surface 14a and a second surface 14b, opposite the first surface. An EAS marker 15 may be secured to either side 14a, b of the card 14, in order to further deter theft of the card, as best illustrated in FIG. 3. The card 14 may also include a hanger 17 for removably attaching the card to a display rack, as is known in the art.

Figure 5:
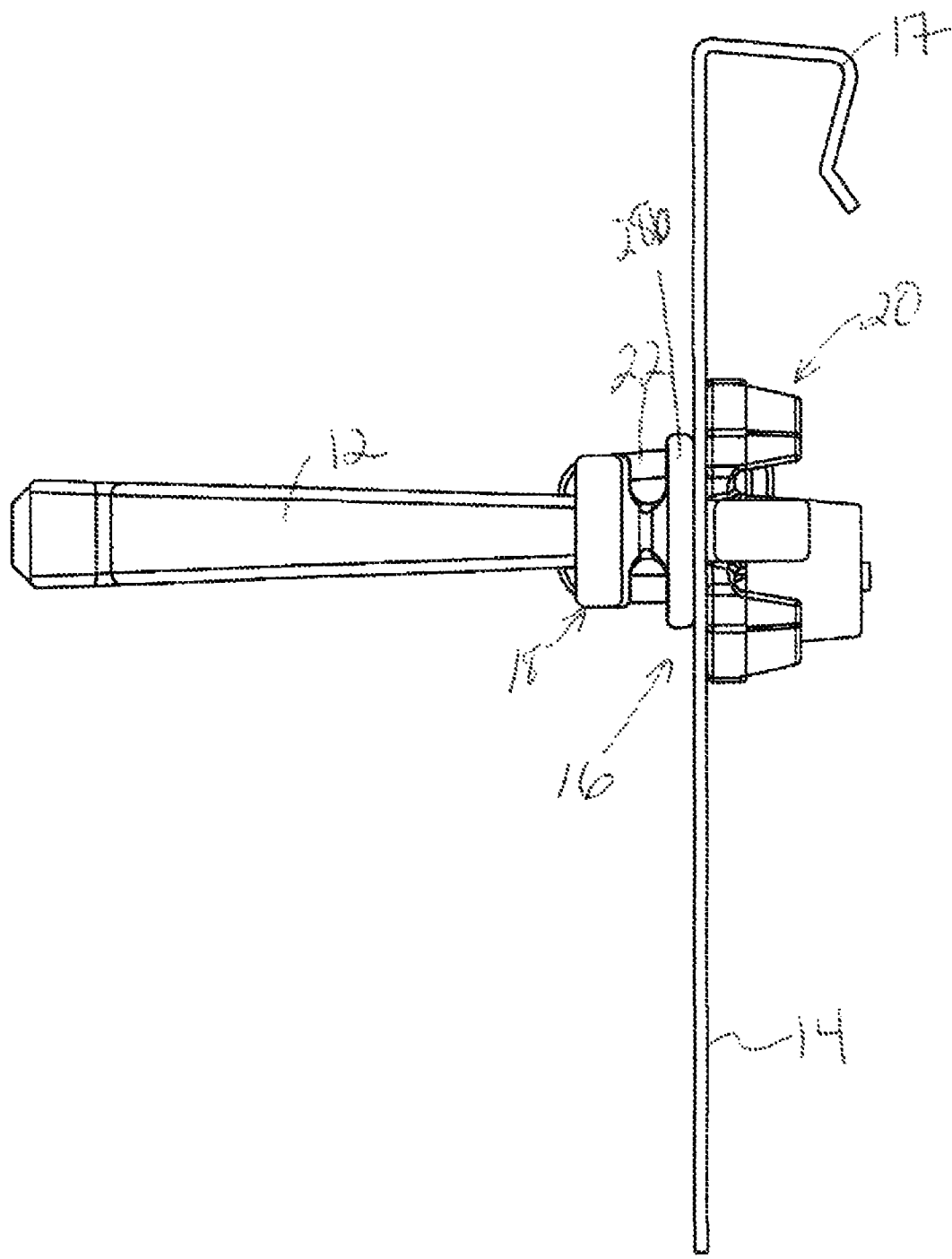
FIG. 5 is a side view of the anti-theft ring assembly of FIG. 1.
Figure 6:
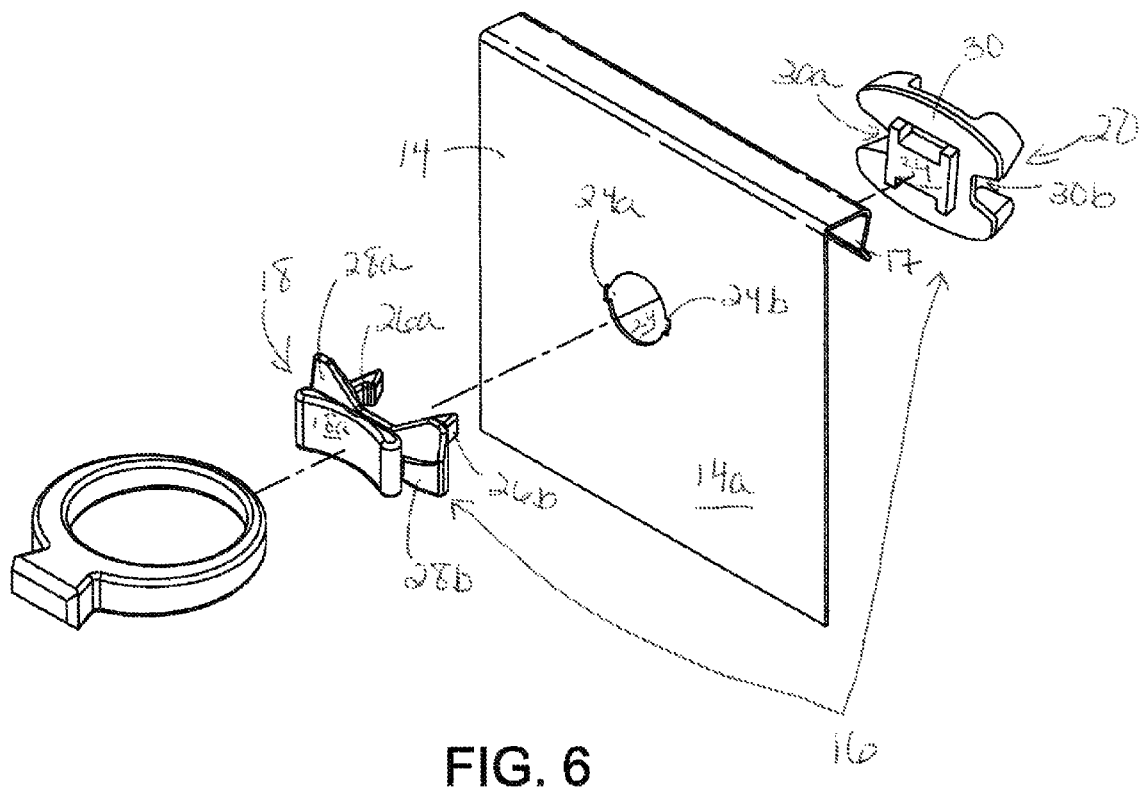
FIG. 6 is an exploded view of the anti-theft ring assembly of FIG. 1.

As best illustrated in FIGS. 5 and 6, product engagement member 16 includes support member 18 that supports the ring 12 during use and locking member 20 that secures the support member 18 to the card 14. In the present embodiment, the support member 18 and locking member 20 are formed as separate components. Alternatively, they may be formed as a single, unitary member, as described below with respect to the second and third embodiments.

Figure 16:
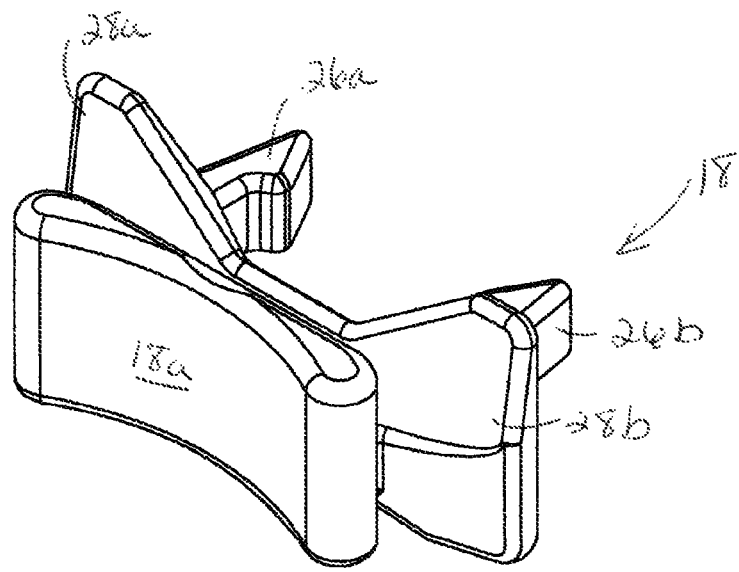
FIG. 16 is an enlarged, front perspective view of the support member of the anti-theft ring assembly of FIG. 1.
Figure 17:
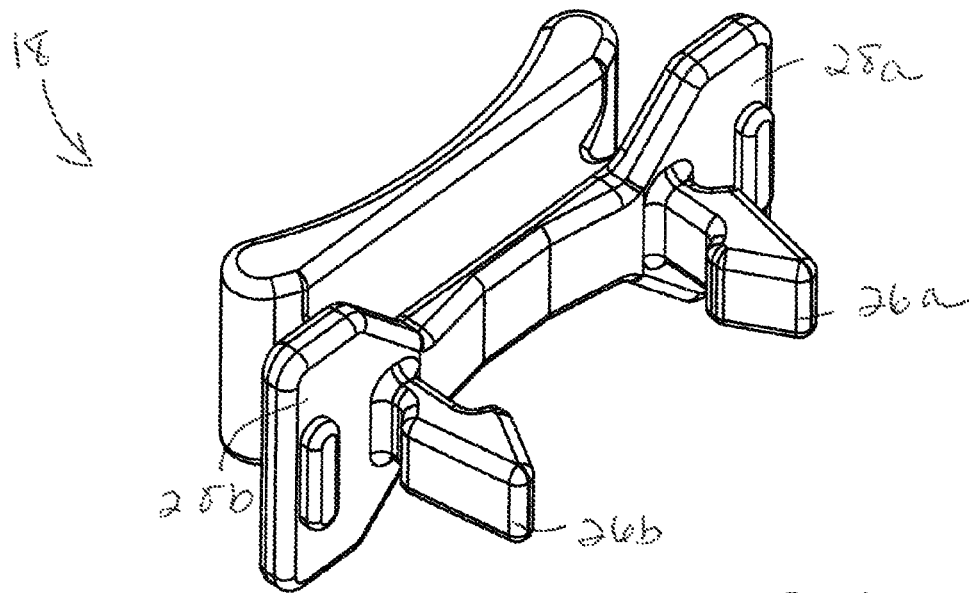
FIG. 17 is an enlarged, rear perspective view of the support member of the anti-theft ring assembly of FIG. 1.

Referring now to FIGS. 16 and 17, support member 18 has a curved or arcuate construction 18a for supporting a circular shank portion of the ring 12. In the present embodiment, the support member 18 also has a curvature sufficient to stop the ring 12 from slipping off the support member, or being pulled off by force. The support member 18 may also preferably support the ring 12 a sufficient distance from the card 14 so as to allow a consumer to comfortably try on the ring 12 while the ring is supported on the card 14. Support member 18 further includes legs 26a, 26b that are shaped and sized for insertion within notches 24a, 24b of opening 24 of card 14 during assembly. The legs 26a, 26b may be designed to flex slightly as they are inserted within the opening of the card. At least a portion of the support member is sized to be larger than opening 24. In the present embodiment, the support member further includes an extension portion 28a, 28b that act as a stop once legs 26a, 26b are inserted within opening 24. As illustrated in FIG. 1, the extensions 28a, 28b rest against the first surface 14a of the card 14 in use. The extensions 28a, 28b stop the engagement member 16 from being pulled through the opening 24 out of engagement with card 14.

Figure 9:
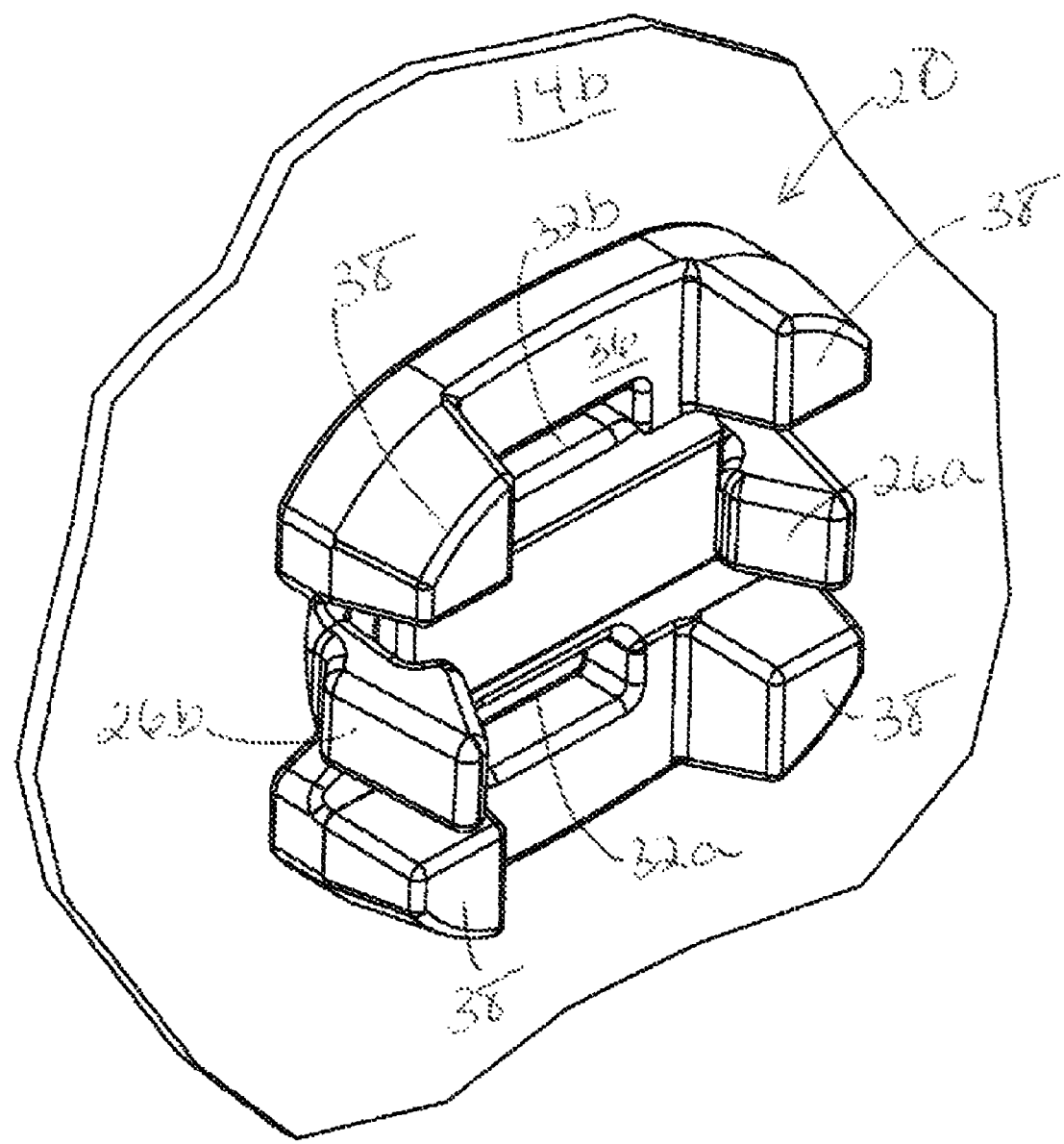
FIG. 9 is an enlarged, rear perspective view of the support member and locking member of the anti-theft ring assembly of FIG. 1 in a secured position attached to the base during assembly.

Locking member 20 is designed to secure the support member 18 to the card 14, and also to guide the attachment member 22 and to help secure the attachment member 22 to card 14. In the present embodiment, locking member includes a body 30 with indentations 30a, 30b for receiving legs 26a, 26b of support member 18 in snap-fit engagement, as best shown in FIG. 9. The body 30 of locking member 20 acts as a stop once the legs 26a, 26b are inserted within the indentations 30a, 30b, helping to prevent removal of the support member. The locking member 20 may also preferably have a relatively small profile so that once the support member 18 and locking member 20 are attached to the card 14, it is difficult to grasp the locking member 20 and turn the support member 18. This also helps prevent torque from being applied to break the attachment member.

Figure 18:
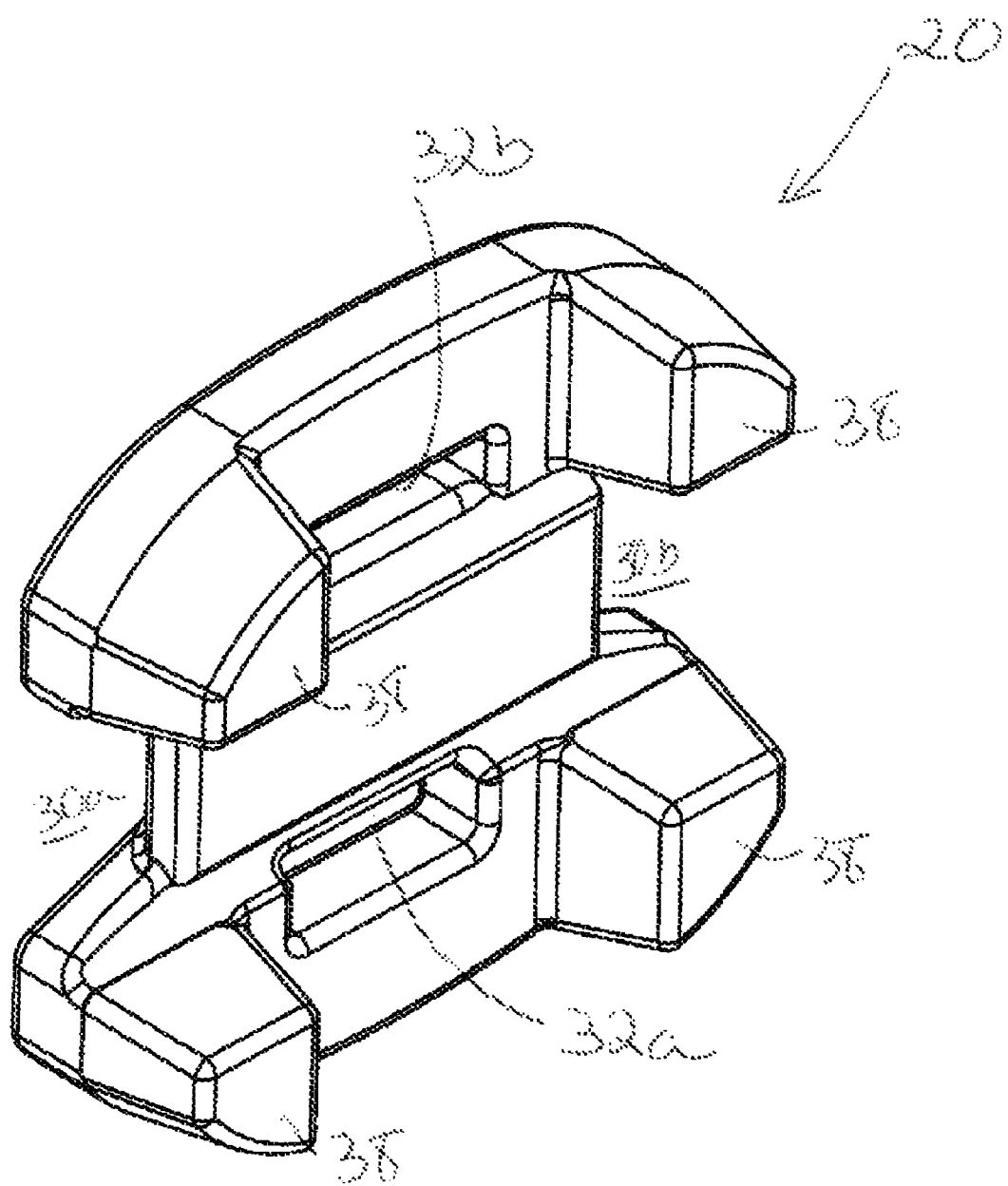
FIG. 18 is an enlarged, front perspective view of the locking member of the anti-theft ring assembly of FIG. 1.
Figure 19:
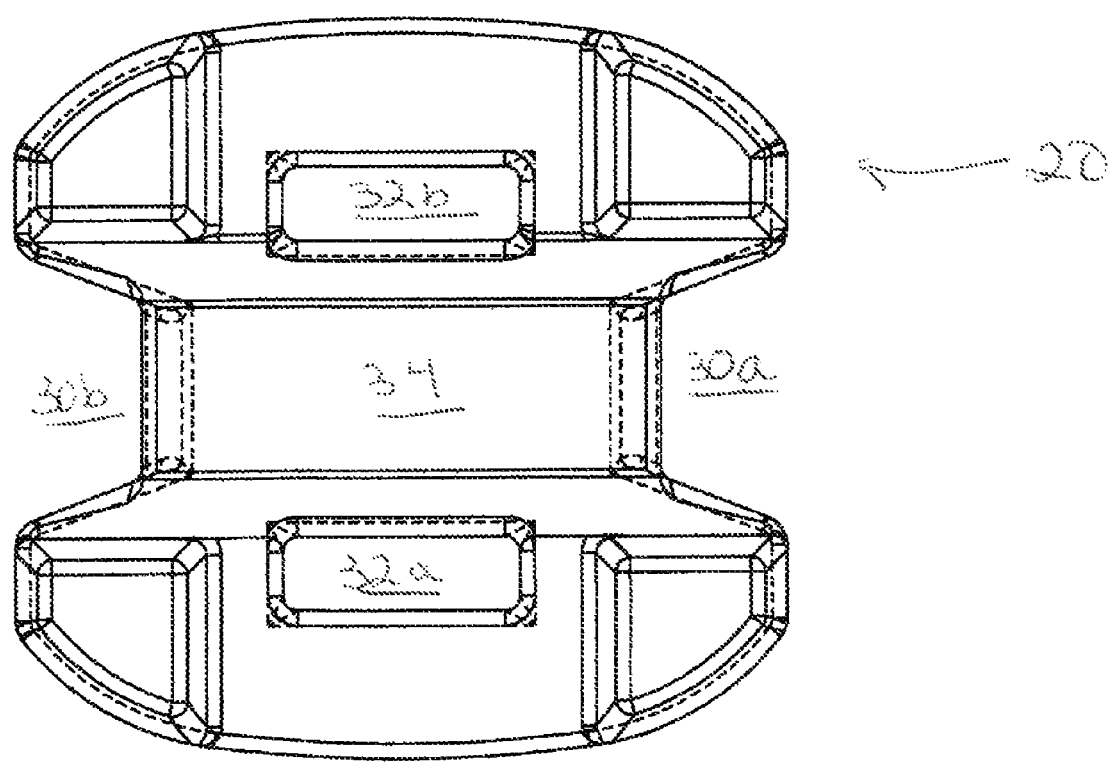
FIG. 19 is an enlarged, rear view of the locking member of the anti-theft ring assembly of FIG. 1.

Referring now to FIGS. 18 and 19, locking member 20 further includes a pair of openings 32a, 32b sized to receive a portion of the attachment member 22 there through. In the present embodiment, the attachment member 22 may be a flexible, tear resistant strap or tie. In use, the tie 22 is inserted through one of the openings 32a, 32b, through the opening 24 in the card 14, around the ring 12, back through the opening 24, and through the other of the openings 32a, 32b before being secured within itself, as described in greater detail below. The body 30 may also include a first, substantially level surface 34 which rests adjacent the card once assembled. The opposing surface 36 of the body 30 may include one or more small protrusions 38, which aid a user in grasping locking member 20 during assembly, but which are difficult to grasp after assembly. Strap or tie 22 may be any of a variety of conventional, off-the-shelf products, and is an adjustable, plastic cable tie in the present embodiment.

Figure 7:
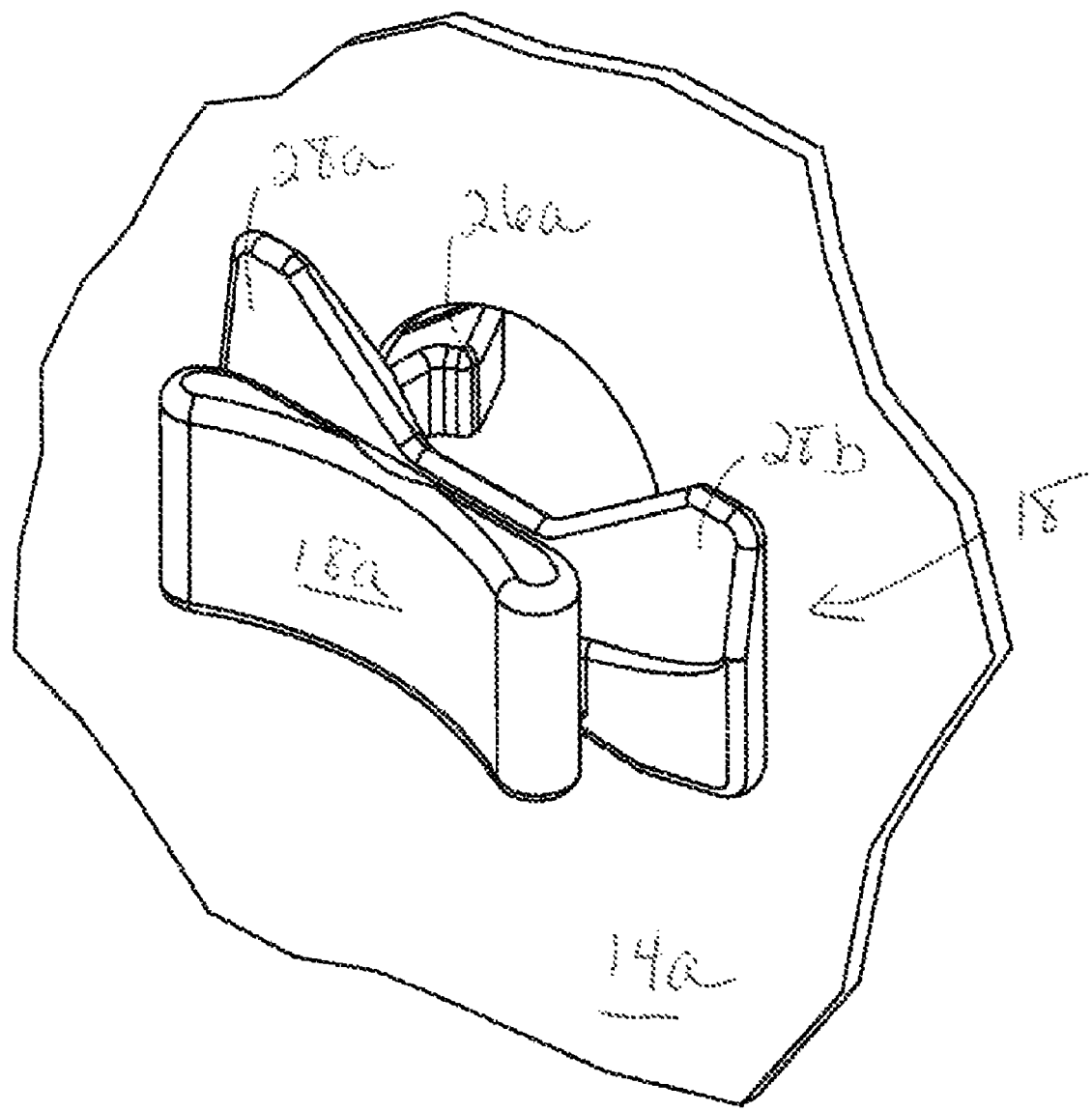
FIG. 7 is an enlarged, front perspective view of the support member of the anti-theft ring assembly of FIG. 1 during assembly.
Figure 8A:
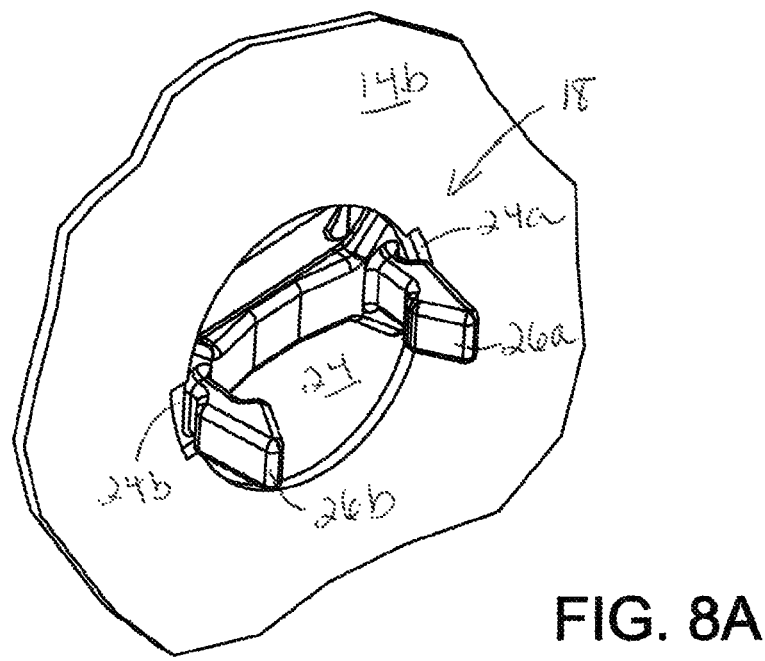
FIG. 8A is an enlarged, rear perspective view of the support member of the anti-theft ring assembly of FIG. 1 during assembly.
Figure 8B:
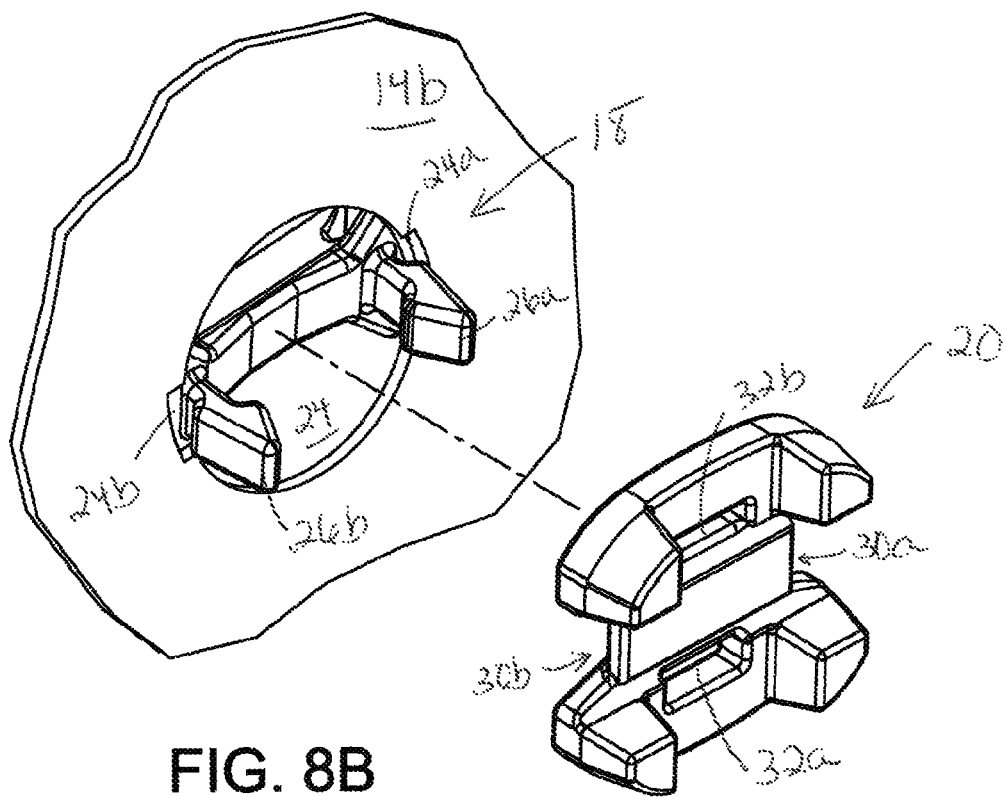
FIG. 8B is an enlarged, rear perspective view of the support member and locking member of the anti-theft ring assembly of FIG. 1 in an unsecured position, during assembly.

Construction of the ring assembly will now be described with reference to FIGS. 7-15. Legs 26a, 26b of support member 18 are inserted within opening 24 in card 14 by flexing the legs slightly inward, toward each other, and aligning them with notches 24a, 24b (FIG. 7). Once inserted within the opening 24 the extensions 28a, 28b rest against the first surface 14a of the card 14 and act as a stop to prevent the support member 18 from being pulled through the opening 24 (FIG. 8A). The indentations 30a, 30b of the locking member 20 are then aligned with the legs 26a, 26b (FIG. 8B) and the support member is secured with the locking member 20 in a snap-fit engagement (FIG. 9). In the position illustrated in FIG. 9 the engagement member 16 is secured to the card 14.

Figure 10:
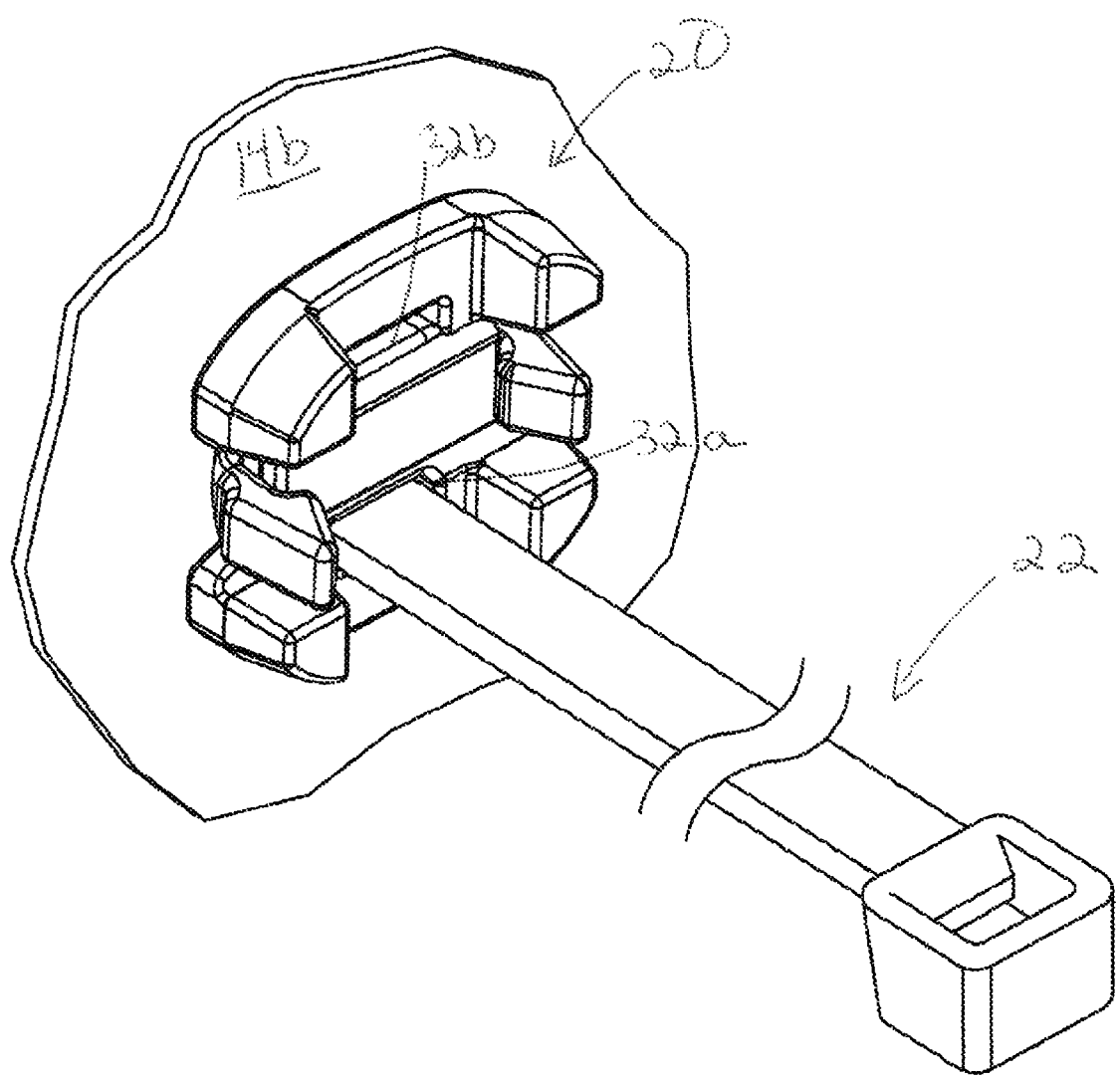
FIG. 10 is an enlarged, rear perspective view of the support member, locking member and tie of the anti-theft ring assembly of FIG. 1 during assembly.
Figure 11:
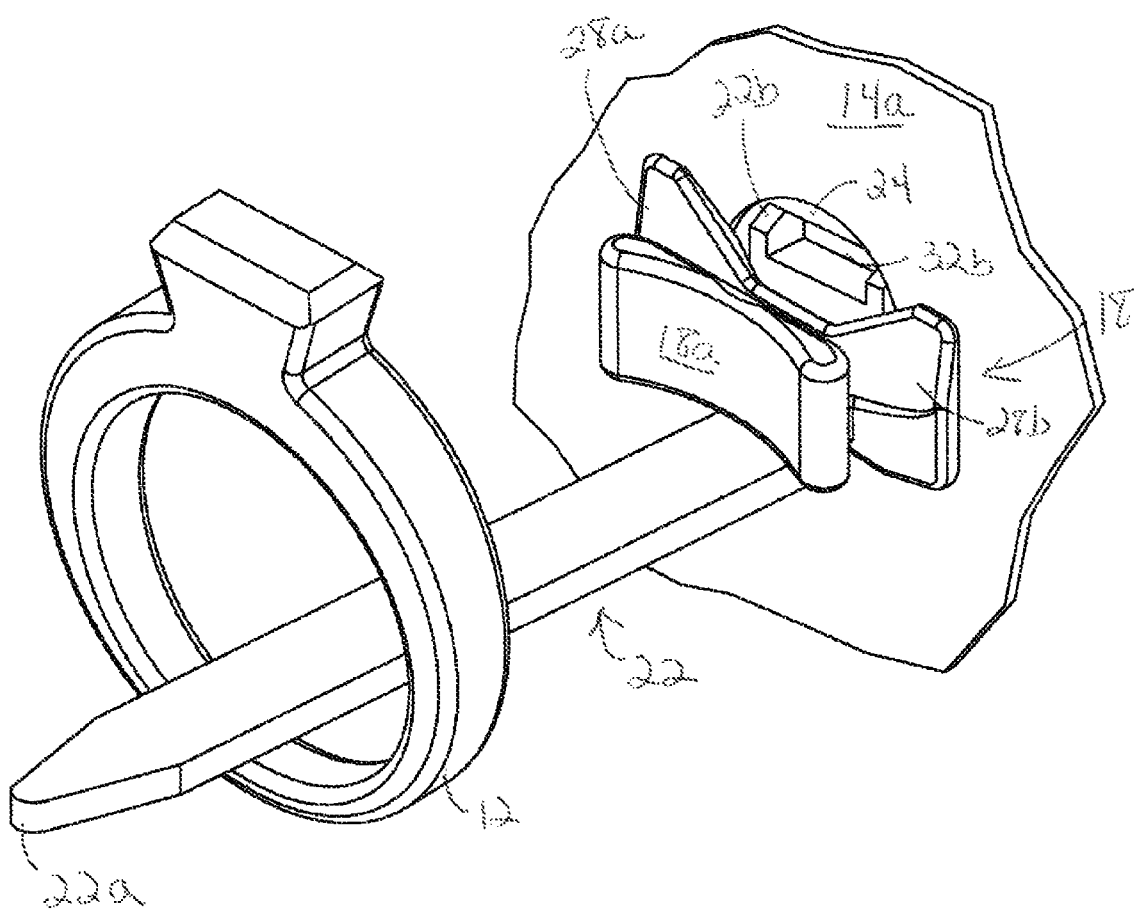
FIG. 11 is an enlarged, front perspective view of the support member and tie of the anti-theft ring assembly of FIG. 1 during assembly.
Figure 12:
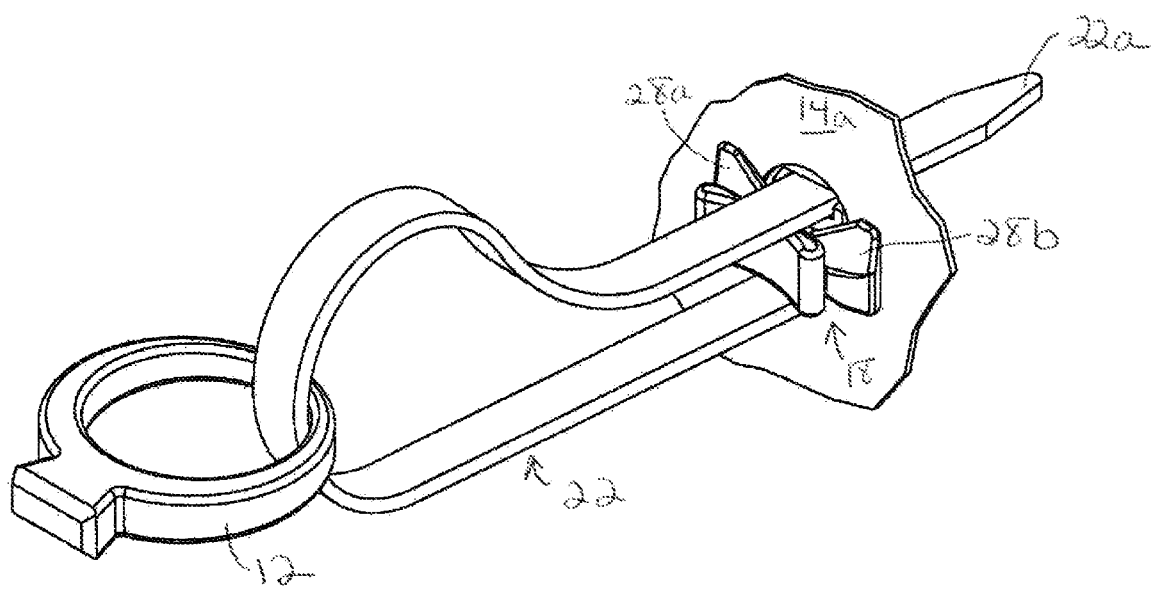
FIG. 12 is an enlarged, front perspective view of the support member and tie of the anti-theft ring assembly of FIG. 1 during assembly.
Figure 13:
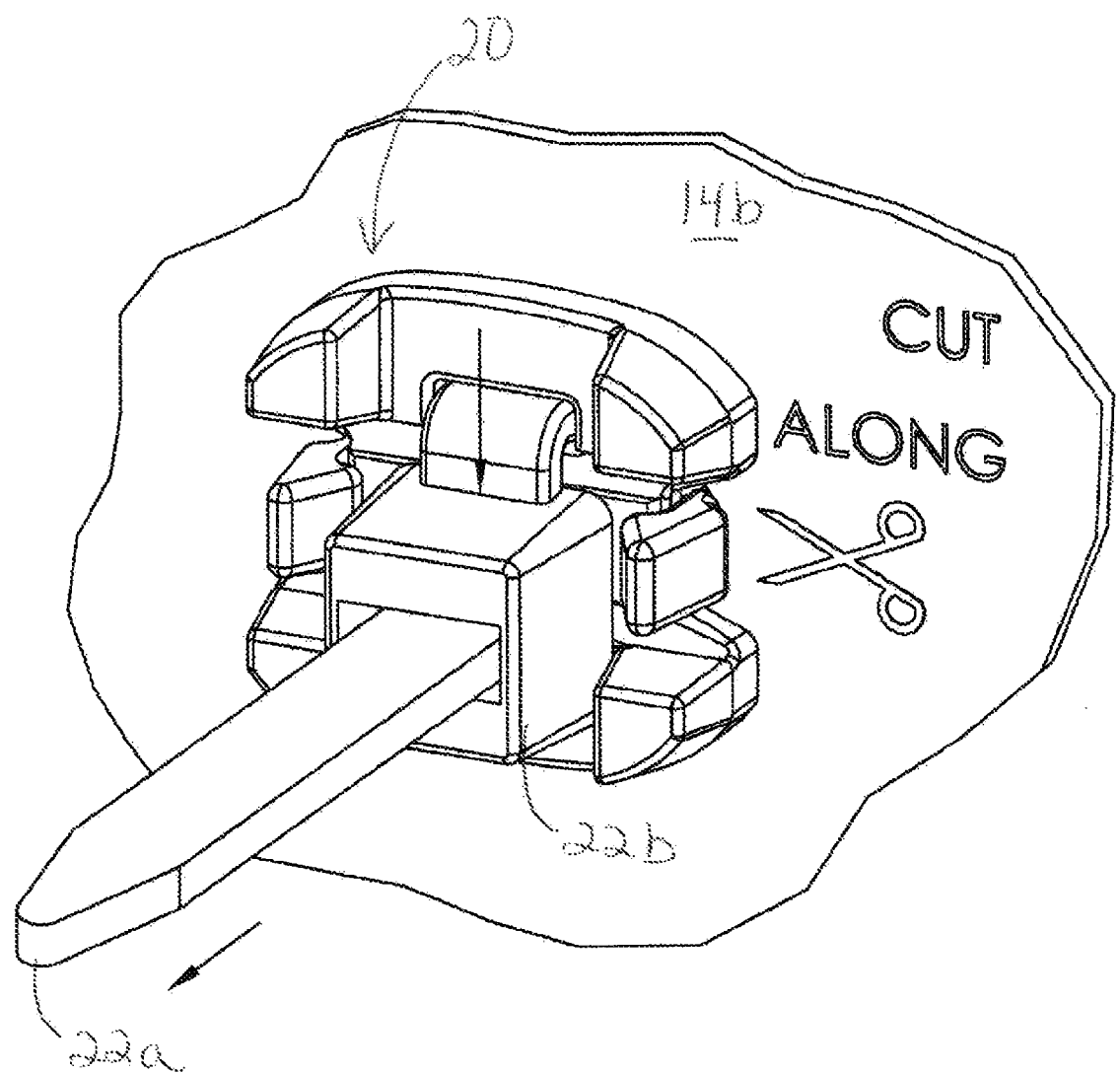
FIG. 13 is an enlarged, rear perspective view of the support member, locking member and tie of the anti-theft ring assembly of FIG. 1 during assembly.
Figure 14:
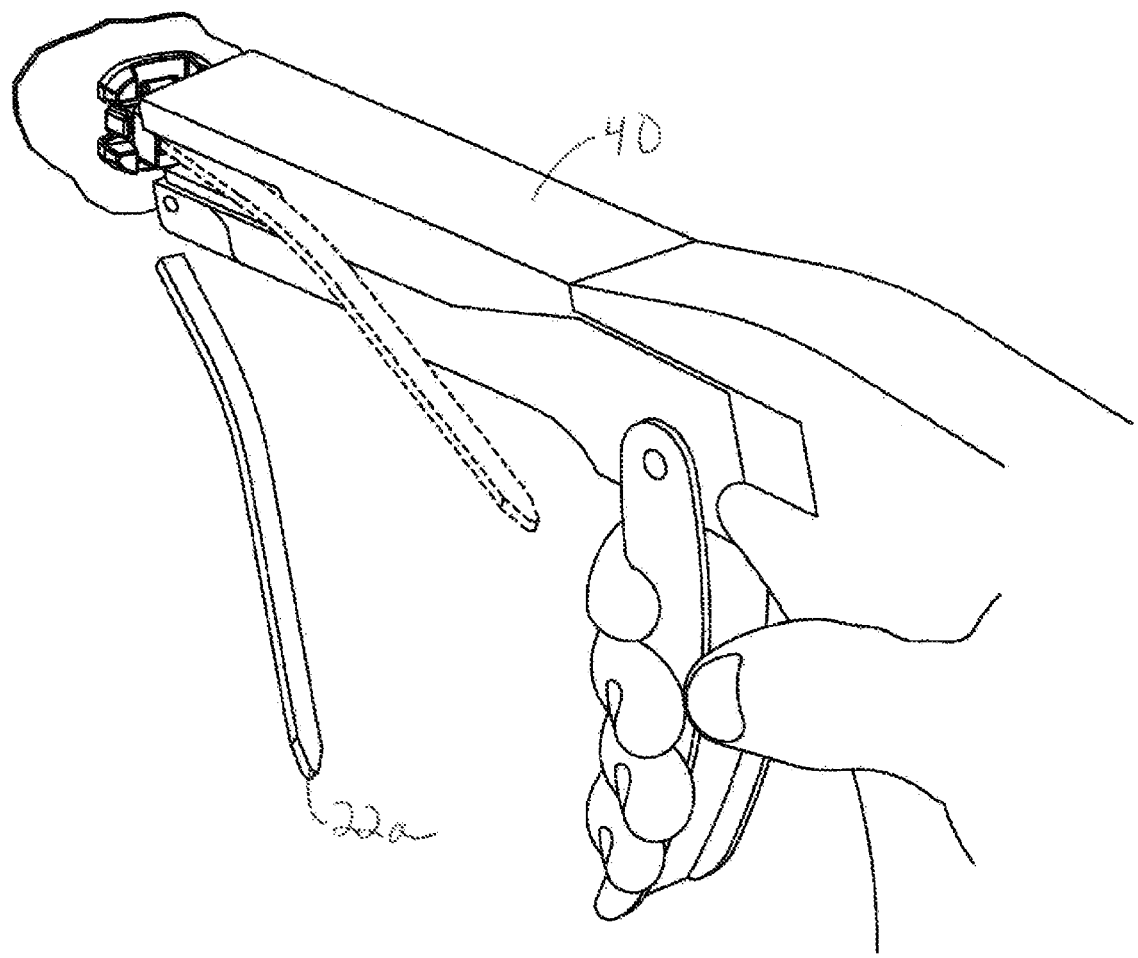
FIG. 14 is a rear perspective view of a tie-cutting gun in use with the anti-theft ring assembly of FIG. 1 during assembly.
Figure 15:
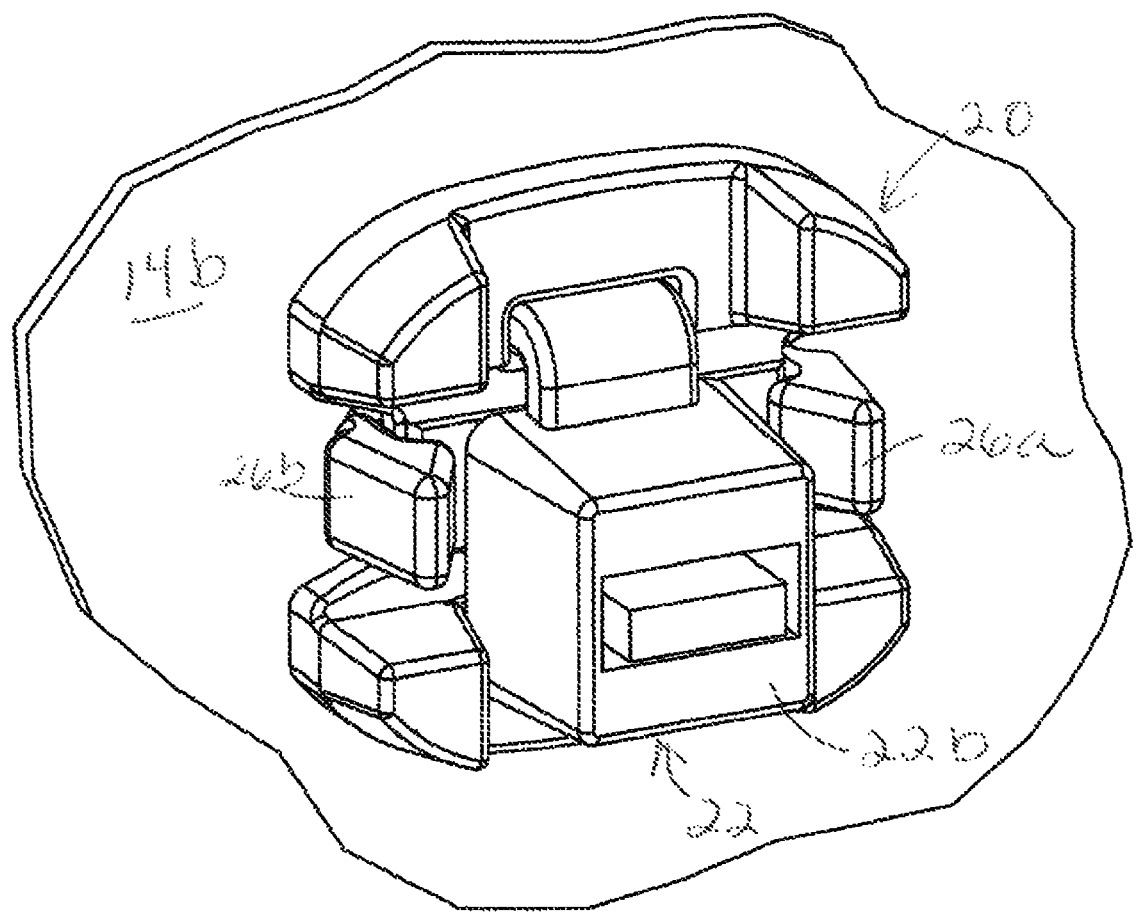
FIG. 15 is an enlarged, rear perspective view of the support member, locking member and tie of the anti-theft ring assembly of FIG. 1 fully assembled.

To secure the ring 12 to the engagement member 16, a leading end 22a of the tie 22 is inserted through one of the openings 32a, 32b in locking member 20 and through the opening in the card 14 (FIGS. 10-11). The leading end 22a is then inserted through the ring 12, back through the opening 24 in card 14, and through the other of the openings 32a, 32b in locking member 20 (FIG. 12). The leading end 22a is then inserted through the trailing end 22b of the tie 22, and pulled until the ring 12 is seated on the support member 18 (FIG. 13). Once the leading end 22a of the tie 22 is inserted into the trailing end 22b, the tie is adjustable in only one direction, to tighten the tie, as is known in the art. Once the tie 22 is tightened so that the ring 12 is seated on the support member 18, final tightening and cutting of the tie 22 can be done. A cable tie gun 40 can be utilized to ratchet the tie 22 to its tightest position without damaging the card 14, and cut the tie 22 (FIG. 14). The cable tie gun 40 is also a conventional, off-the-shelf device that is readily available and known in the art. Once the leading edge 22a of the tie 22 has been cut, the anti-theft ring assembly 10 is complete (FIG. 15).

Figure 4:
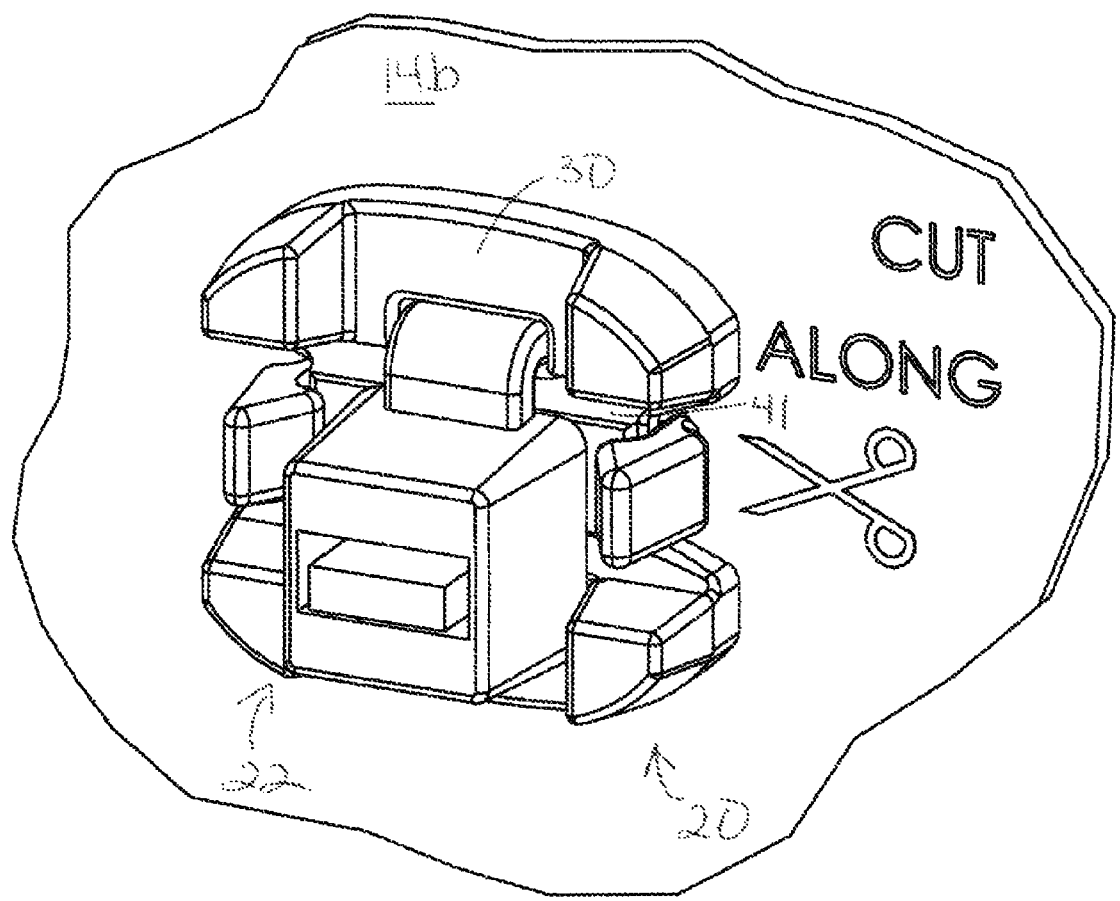
FIG. 4 is an enlarged, rear perspective view of the engagement member of the anti-theft ring assembly of FIG. 3.
Figure 20:
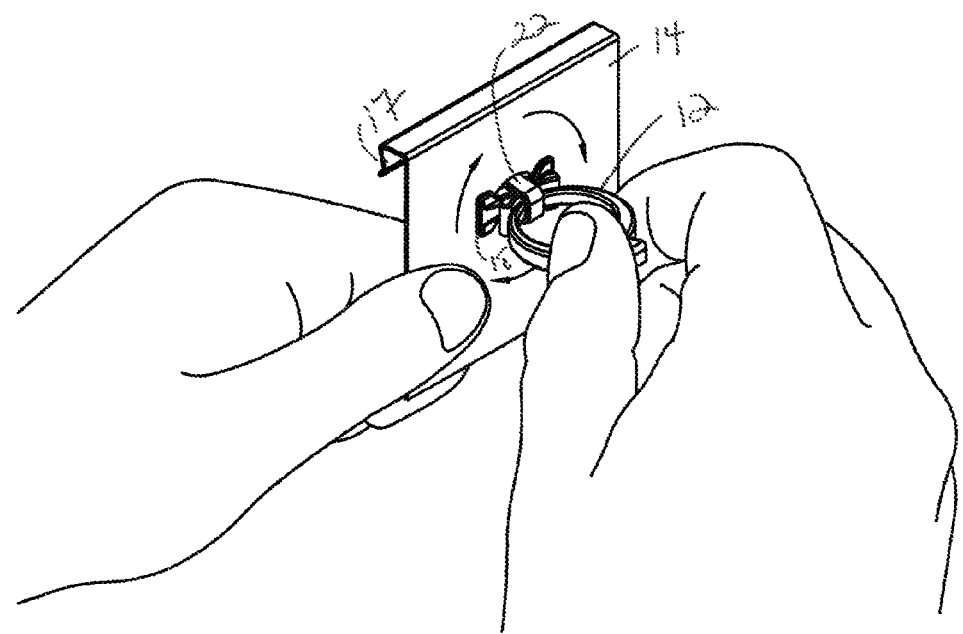
FIG. 20 is a front, perspective view of the anti-theft ring assembly of FIG. 1 fully assembled illustrating rotation of the ring assembly in a first position.
Figure 21:
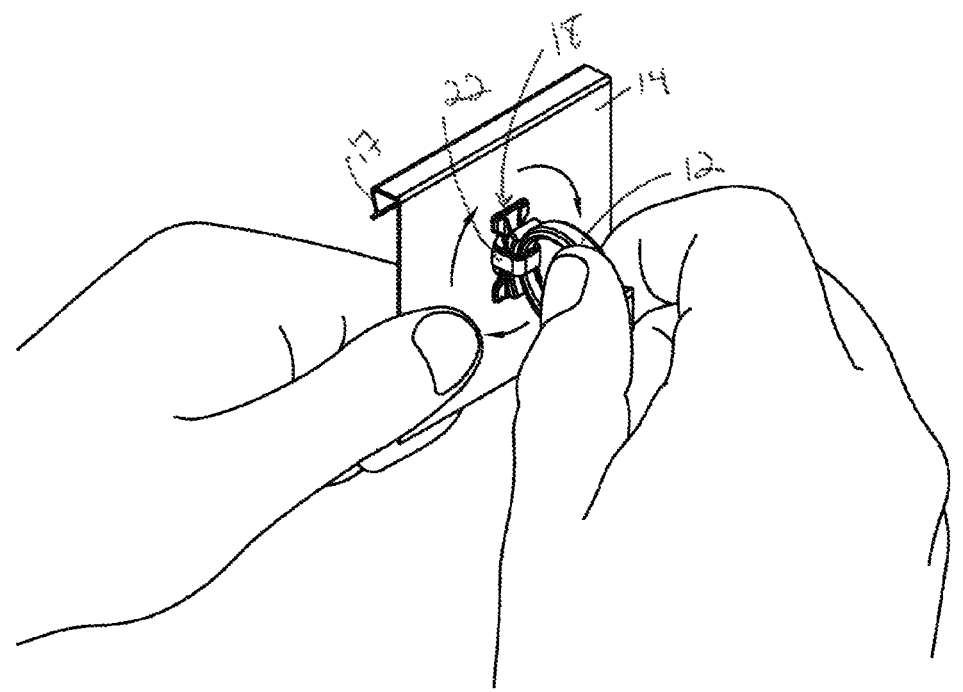
FIG. 21 is a front, perspective view of the anti-theft ring assembly of FIG. 1 fully assembled illustrating rotation of the ring assembly in a second, rotated position.

Referring now to FIGS. 20 and 21, if a consumer attempts to twist or turn ring 12 in an attempt to create torque sufficient to break tie 22, the engagement member 16 will simply rotate within opening 24 on card 14 and the ring 12 will remain attached thereto. In order for a consumer to remove the ring 12 from the engagement member 16, the tie 22 must be cut. To cut the tie 22, a conventional pair of scissors can be inserted within channel 41 (FIGS. 3-5).

Referring now to FIGS. 22-28, an exemplary second embodiment of an anti-theft ring assembly used to deter theft of a ring is illustrated. In this embodiment, the same or similar elements as the embodiment of FIGS. 1-21 are labeled with the same reference numbers, preceded with the numeral "1". The anti-theft ring assembly 110 likewise includes a base 114 that can be used to support an EAS marker; a product engagement member 116 including a support member 118 that supports the ring 112 during use and a locking member 120 that secures the support member 118 to the base 114; and an attachment member 122 for securing the ring 112 to the support member 118. However, in this embodiment the support member 118 and the locking member 120 are formed as a single, unitary member.

Figure 23:
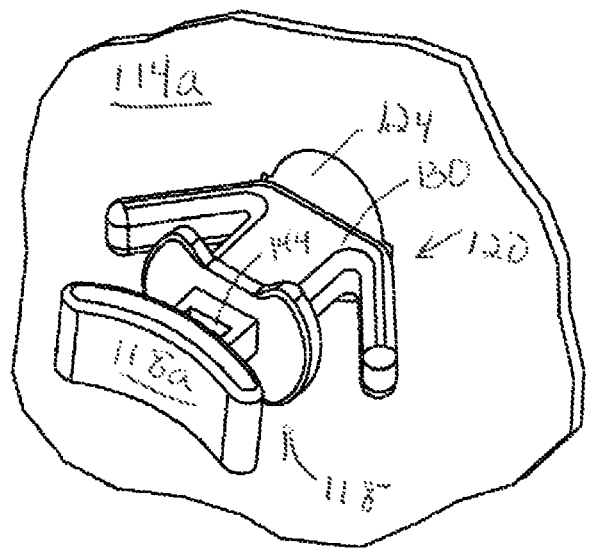
FIG. 23 is an enlarged, front perspective view of the engagement member of the anti-theft ring assembly of FIG. 22 during assembly.
Figure 24:
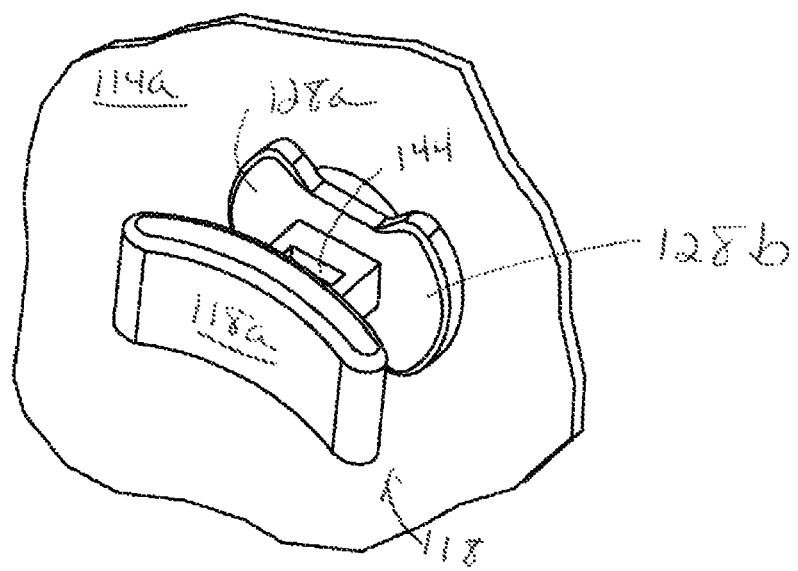
FIG. 24 is an enlarged, front perspective view of the support member of the anti-theft ring assembly of FIG. 22 during assembly.
Figure 25:
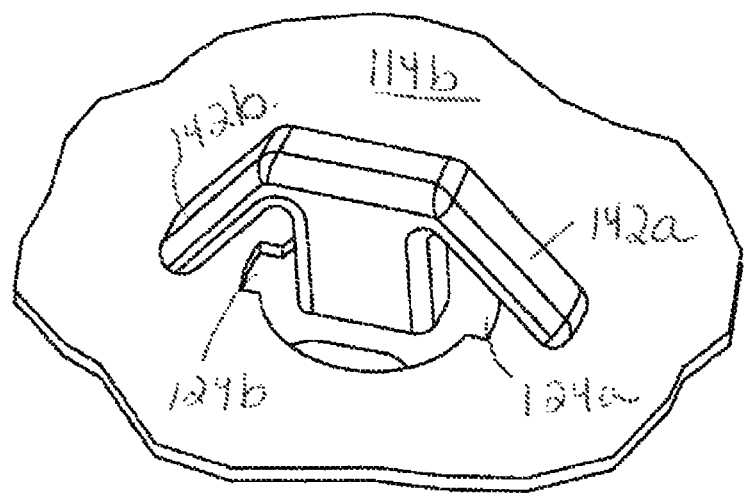
FIG. 25 is an enlarged, rear perspective view of the locking member of the anti-theft ring assembly of FIG. 22 during assembly.

In the present embodiment, support member 118 also has a curved or arcuate construction 118a for supporting a circular shank portion of the ring 112 and to prevent the ring 12 from slipping off the support member, or being pulled off by force. Support member 118 does not, however, include legs for insertion within notches 124a, 124b of opening 124 of card 114. Instead, locking member 120 includes a body 130 and legs 142a, 142b extending from the body that are shaped and sized for insertion within notches 124a, 124b of opening 124 of card 114 during assembly (FIG. 23). The legs 142a, 142b may be designed to flex slightly toward each other as in order to be more readily inserted within the notches 124a, 124b. Once inserted through the notches 124a, 124b the legs 142a, 142b rest against the second surface 114b of the card 114 (FIG. 25). The legs 142a, 142b stop the engagement member from being pulled through the opening and out of engagement with the card. Support member 118 also includes extension portions 128a, 128b that act as a stop once legs 126a, 126b are inserted within opening 124. As illustrated in FIG. 24, the extensions 128a, 128b rest against the first surface 114a of the card 114 during use. The extensions also stop the engagement member from being pulled through the opening and out of engagement with the card.

Figure 26:
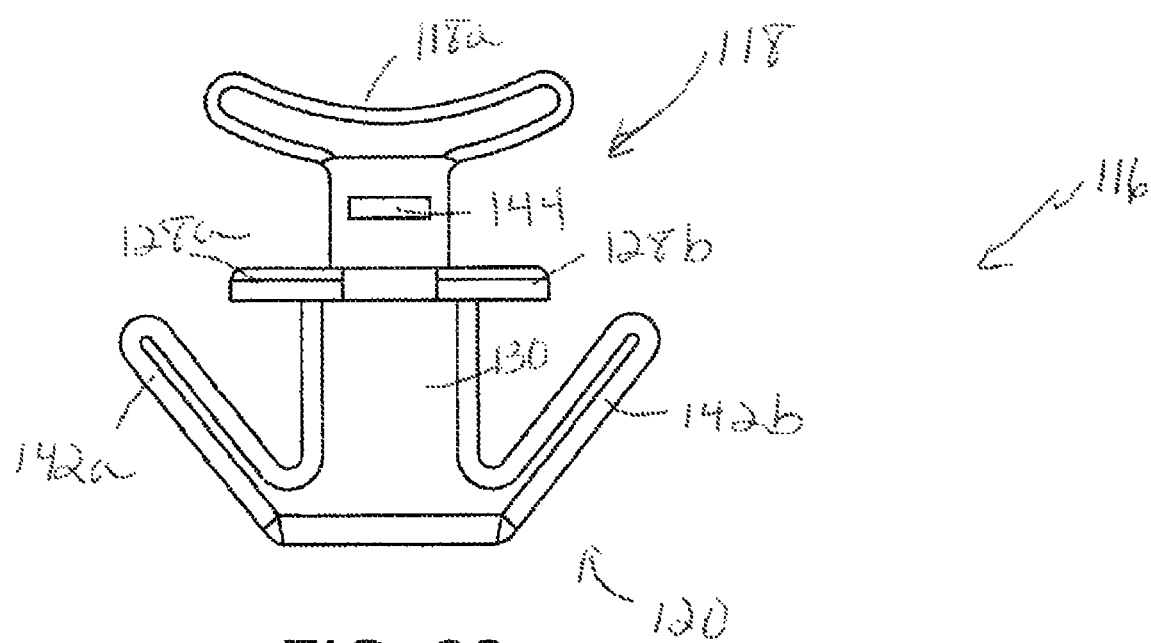
FIG. 26 is a top view of the engagement member of the anti-theft ring assembly of FIG. 22 during assembly.

Locking member 120 is likewise designed to secure the engagement member 116 to the card 114, but in the present embodiment does not guide the tie 122 to more securely attach the tie 122 to card 114. Instead, as shown in FIG. 26, support member 118 includes an opening 144 that is used to guide the tie 122 and securely attach the tie 122 to the first surface 114a (in this embodiment the front surface) of card 114.

Figure 22:
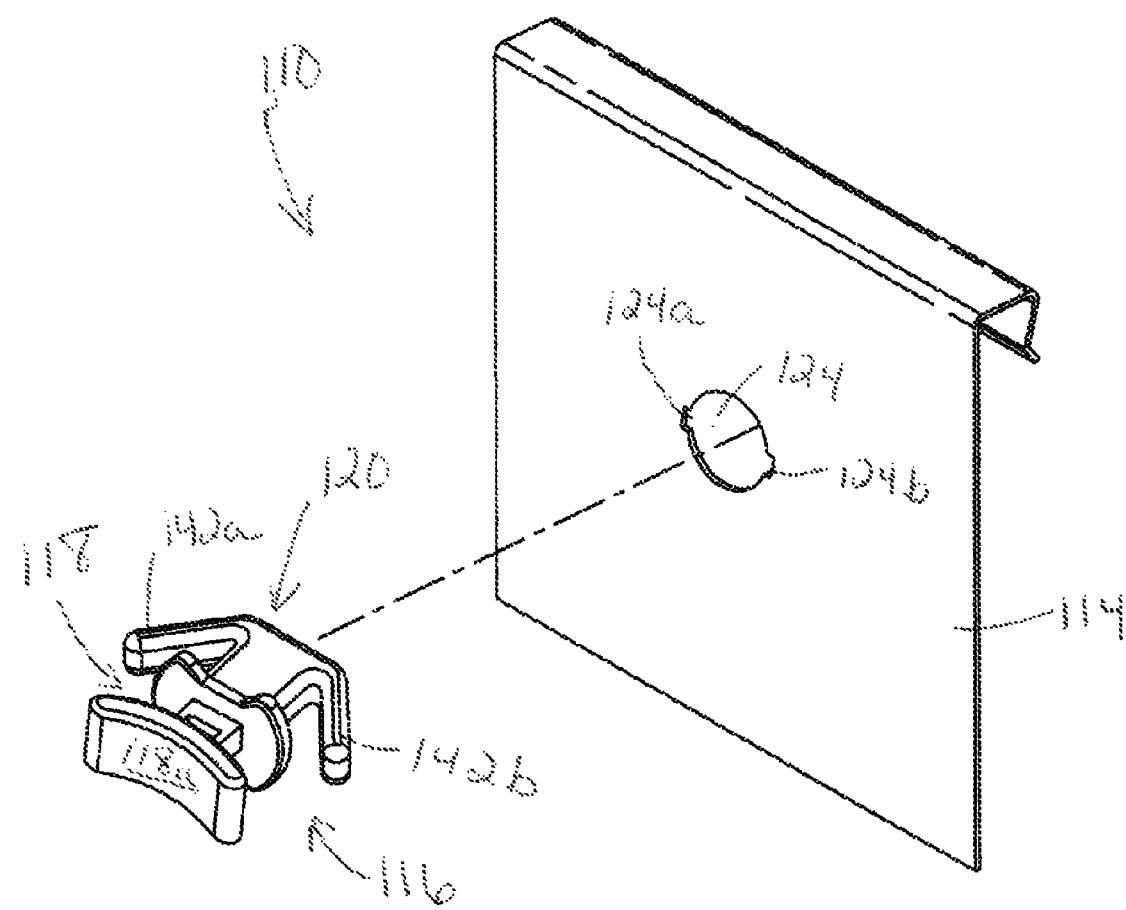
FIG. 22 is a front, perspective view of a second embodiment of an anti-theft ring assembly according to the present disclosure during assembly.
Figure 27:
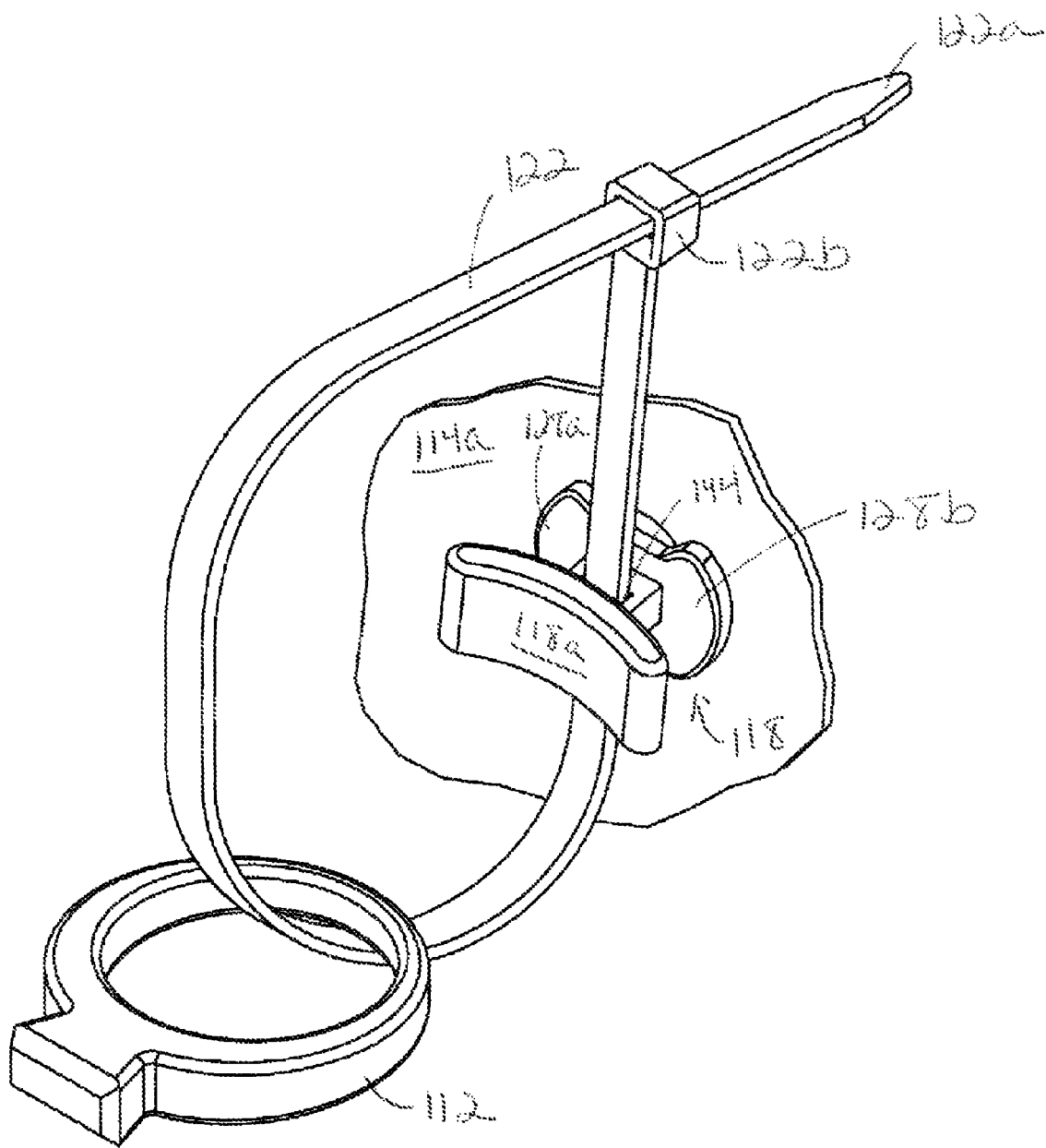
FIG. 27 is an enlarged, front perspective view of the support member and tie of the anti-theft ring assembly of FIG. 22 during assembly.

Construction of the ring assembly will now be described with reference to FIGS. 22-28. Legs 142a, 142b of locking member 120 are inserted within opening 124 in card 114 by flexing the legs slightly inward, toward each other, and aligning them with notches 124a, 124b (FIGS. 22-23). Once inserted within the opening 124 (FIG. 24), the extensions 128a, 128b rest against the first surface 114a of the card 114 and act as a stop to prevent the support member 118 from being pulled through the opening 124. Likewise, the legs 142a, 142b of locking member 120 rest against the second surface 114b of the card 114 to stop the engagement member from being pulled through the opening (FIG. 25). The engagement member is now secured to the card 14. To secure the ring 112 to the engagement member 116, a leading end 122a of the tie 122 is inserted through opening 144 in support member 118, through the ring 112, and through the trailing end 122b of the tie 122 (FIG. 27).

Figure 28:
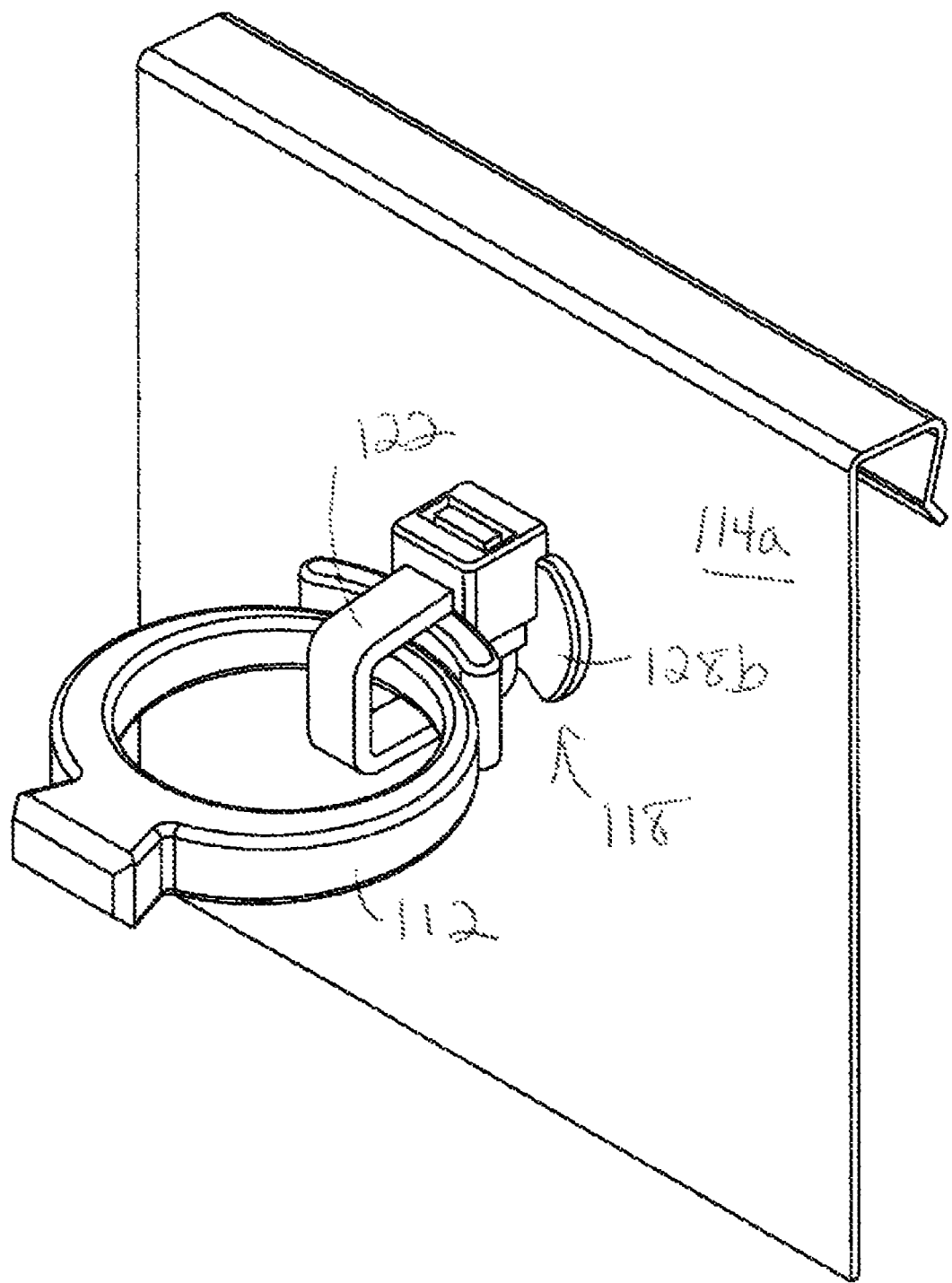
FIG. 28 is a front, perspective view of the anti-theft ring assembly of FIG. 22 fully assembled.

After the leading end of the tie is inserted into the trailing end, the tie is adjustable in one direction, to tighten the tie, as is known in the art. The tie is then tightened until the ring 112 is seated on the support member 118, and final tightening and cutting of the tie is then done by a cable gun, as described above with respect to FIGS. 1-21. Once the leading edge of the tie has been cut, the anti-theft ring assembly is complete (FIG. 28).

Referring now to FIGS. 32-39, an exemplary third embodiment of an anti-theft ring assembly used to deter theft of a ring is illustrated. In this embodiment, the same or similar elements as any of the previous embodiments are labeled with the same reference numbers, preceded with the numeral "2". The anti-theft ring assembly 210 likewise includes a base 214 that can be used to support an EAS marker; a product engagement member 216 including a support member 218 that supports the ring 212 during use and a locking member 220 that secures the support member 218 to the base 214; and an attachment member 222 for securing the ring 212 to the support member 218. However, in this embodiment the support member 218 and the locking member 220 are formed as a single, unitary member.

Figure 32:
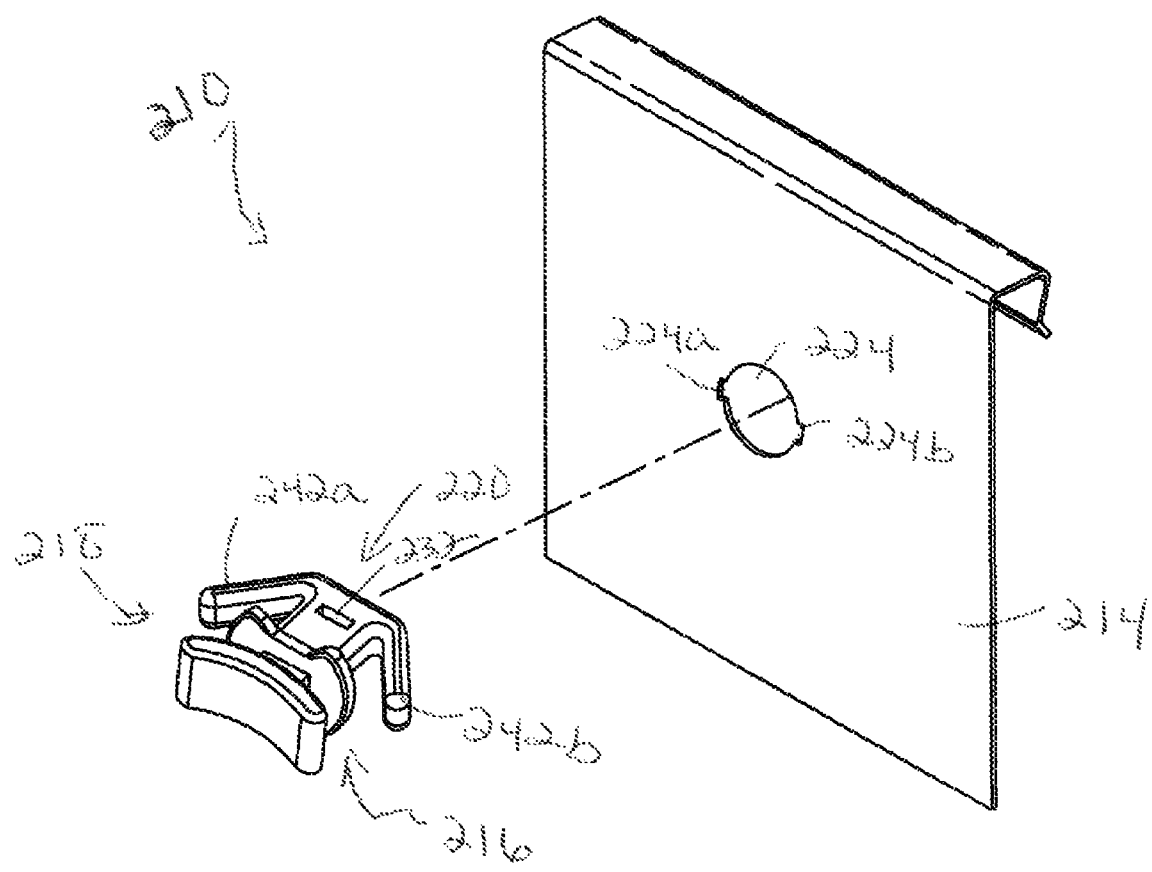
FIG. 32 is a front, perspective view of a third embodiment of an anti-theft ring assembly according to the present disclosure during assembly.
Figure 34:
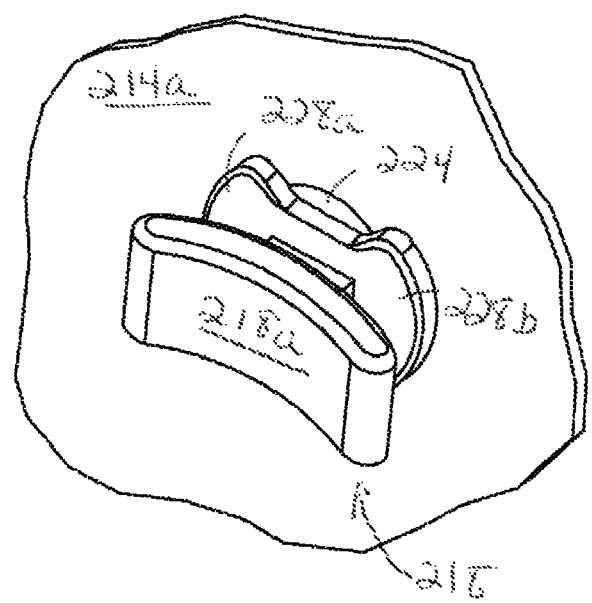
FIG. 34 is an enlarged, front perspective view of the support member of the anti-theft ring assembly of FIG. 32 during assembly.
Figure 35:
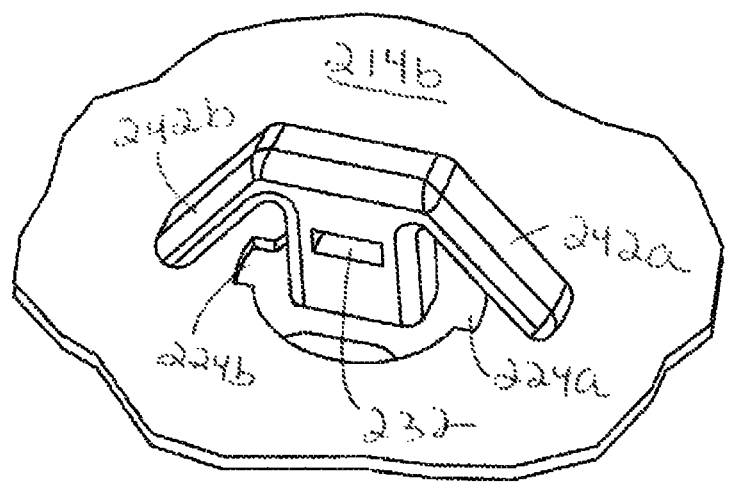
FIG. 35 is an enlarged, rear perspective view of the locking member of the anti-theft ring assembly of FIG. 32 during assembly.
Figure 36:
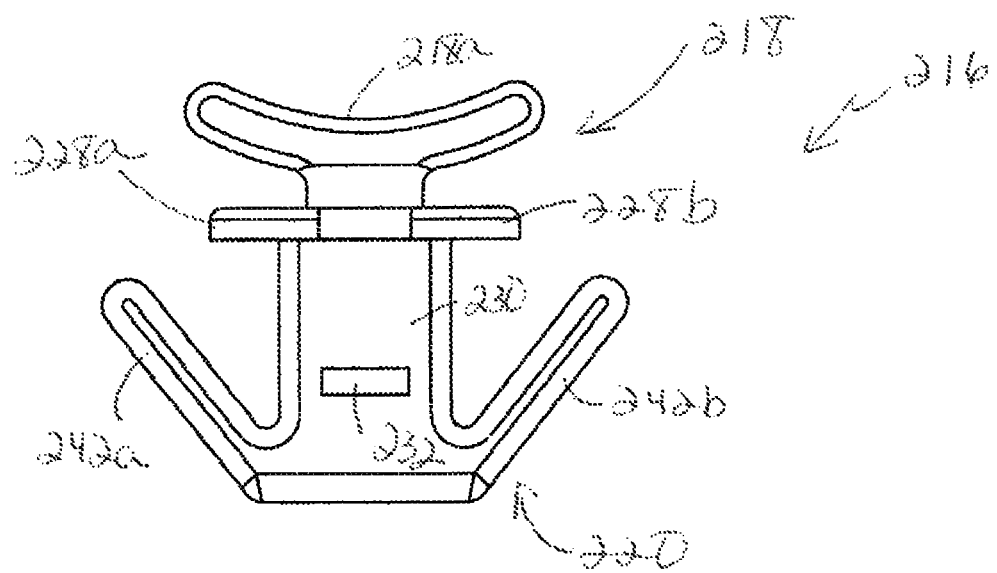
FIG. 36 is a top view of the engagement member of the anti-theft ring assembly of FIG. 32 during assembly.

In the present embodiment, support member 218 also has a curved or arcuate construction 218a for supporting a circular shank portion of the ring 212 and to prevent the ring 212 from slipping off the support member, or being pulled off by force. Support member 218 does not, however, include legs for insertion within notches 224a, 224b of opening 224 of card 214. Instead, locking member 220 includes a body 230 and legs 242a, 242b extending from the body that are shaped and sized for insertion within notches 224a, 224b of opening 224 of card 214 during assembly (FIG. 32). The legs 242a, 242b may be designed to flex slightly toward each other as in order to be more readily inserted within the opening 224. Once inserted through the notches 224a, 224b the legs 242a, 242b rest against the second surface 214b of the card 214 (FIG. 35). The legs 242a, 242b stop the engagement member from being pulled through the opening and out of engagement with the card. Support member 218 also includes extension portion 228a, 228b that acts as a stop once legs 226a, 226b are inserted within opening 224. As illustrated in FIG. 34, extensions 228a, 228b rest against the first surface 214a of the card 214 during use. The extensions also stop the engagement member from being pulled through the opening and out of engagement with the card.

Locking member 220 is likewise designed to secure the engagement member 216 to card 214, and in the present embodiment also guides the tie 222 to more securely attach the tie 222 to card 214. Locking member 220 also includes an opening 232 sized to receive a portion of the tie 222 there through. In use, tie 222 is inserted through opening 232, into opening 224 in the card 214, around ring 212, back through opening 224, and is secured within itself, as described in greater detail below.

Figure 33:
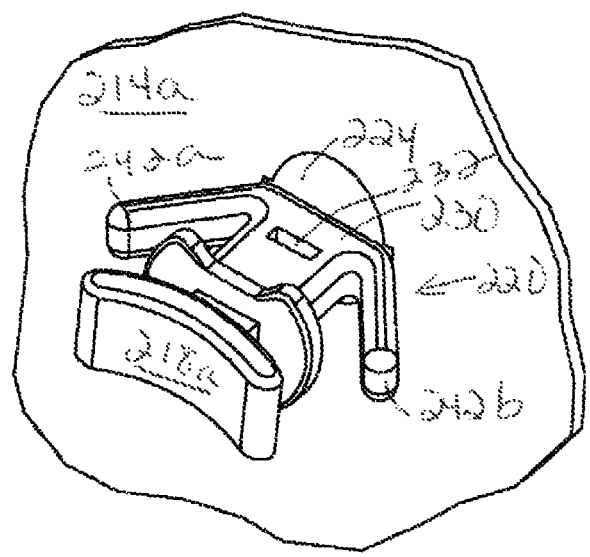
FIG. 33 is an enlarged, front perspective view of the engagement member of the anti-theft ring assembly of FIG. 32 during assembly.
Figure 37:
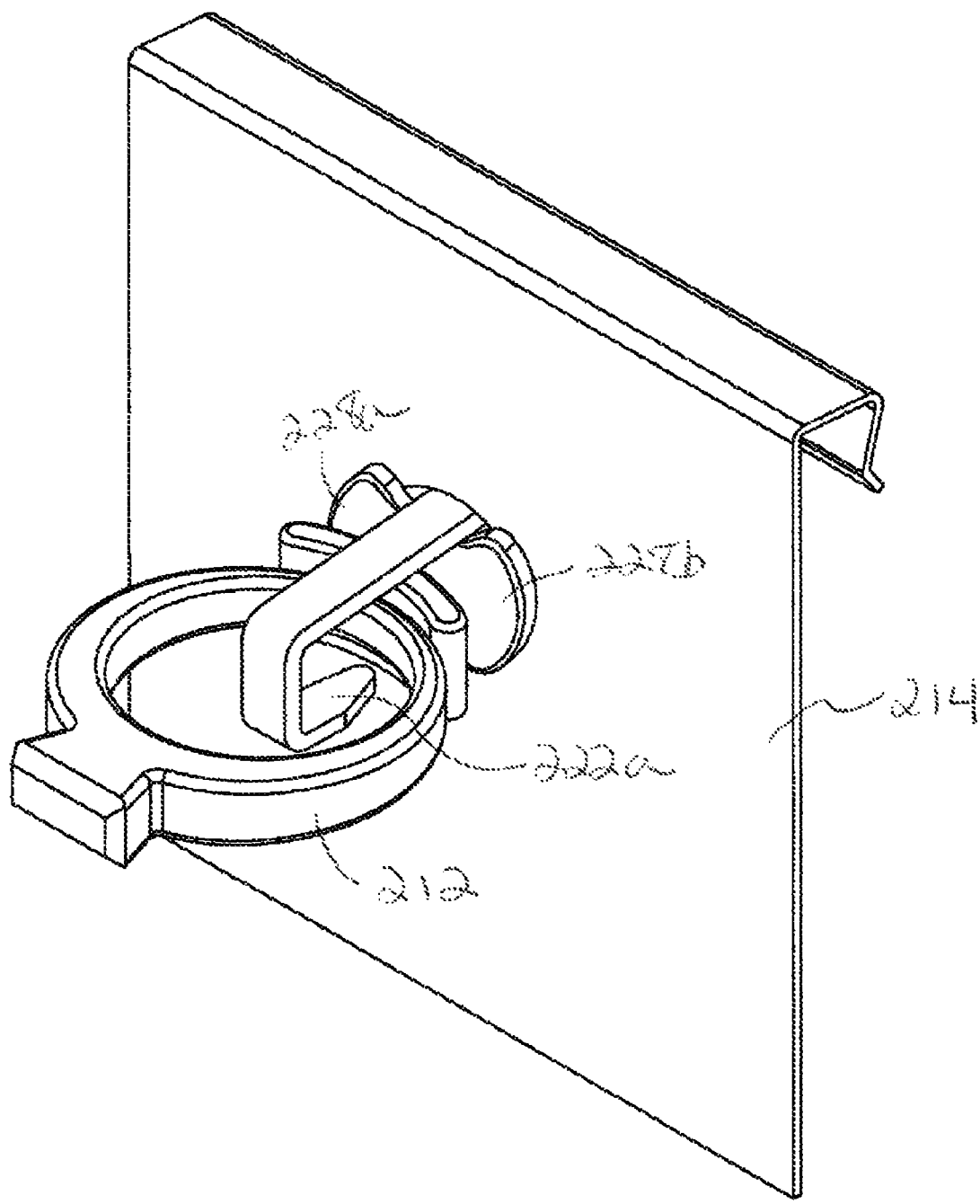
FIG. 37 is an enlarged, front perspective view of the support member and tie of the anti-theft ring assembly of FIG. 32 during assembly.

Construction of the ring assembly will now be described with reference to FIGS. 32-39. Legs 242a, 242b of locking member 220 are inserted within opening 224 in card 214 by flexing the legs slightly inward, toward each other, and aligning them with notches 224a, 224b (FIGS. 32-33). Once inserted within the opening 224 (FIG. 34), the extensions 228a, 228b rest against the first surface 214a of the card 214 and act as a stop to prevent the support member 218 from being pulled through the opening 224. Likewise, the legs 242a, 242b of locking member 220 rest against the second surface 214b of the card 214 to stop the engagement member from being pulled through the opening (FIG. 35). The engagement member is now secured to the card 214. To secure the ring 212 to the engagement member 216, a leading end 222a of the tie 222 is inserted through opening 232 in the locking member 220, through the opening in the card, through ring 212, and through the trailing end 222b of the tie 222 (FIG. 37).

Figure 38:
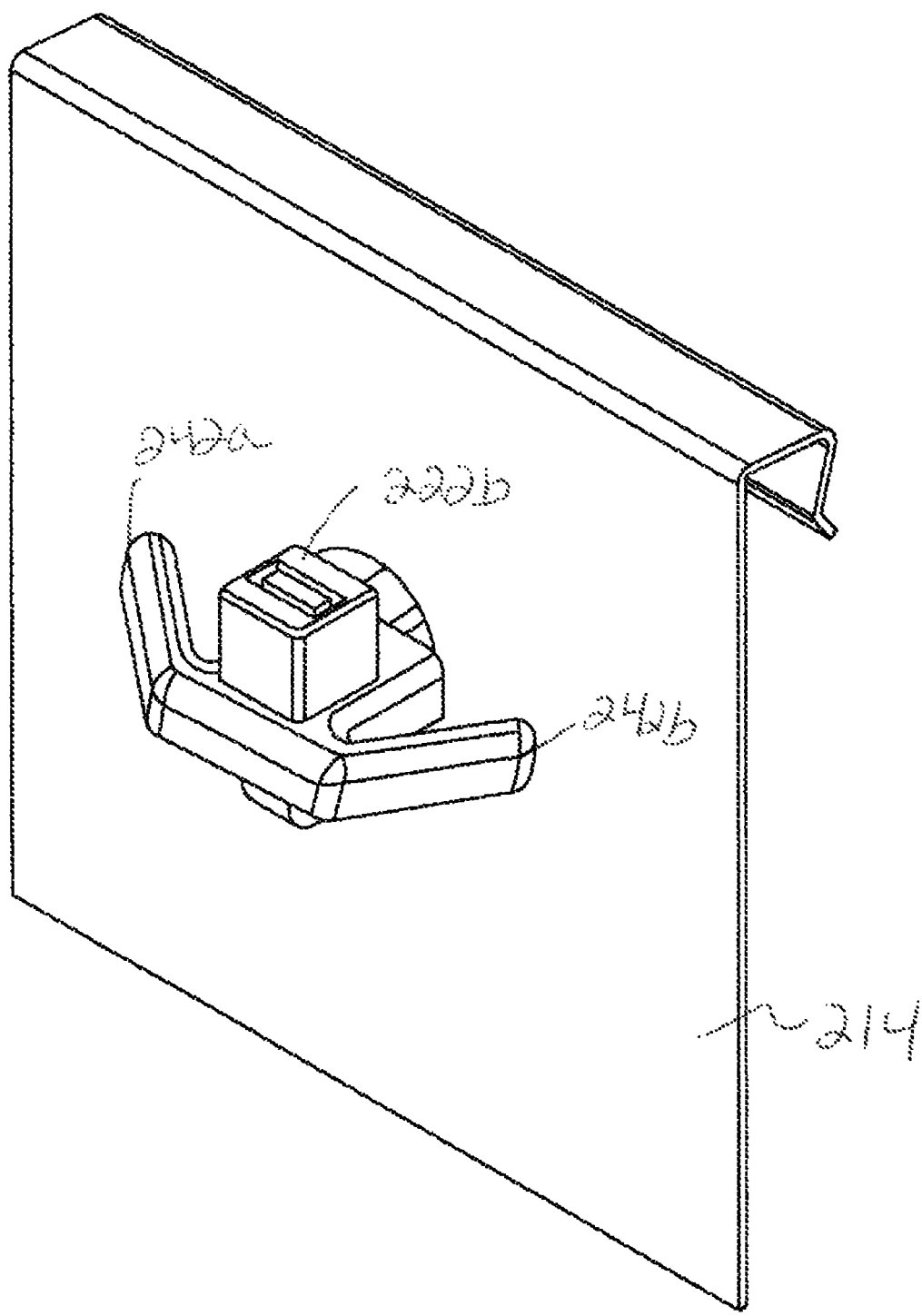
FIG. 38 is an enlarged, rear perspective view of the anti-theft ring assembly of FIG. 32 fully assembled.
Figure 39:
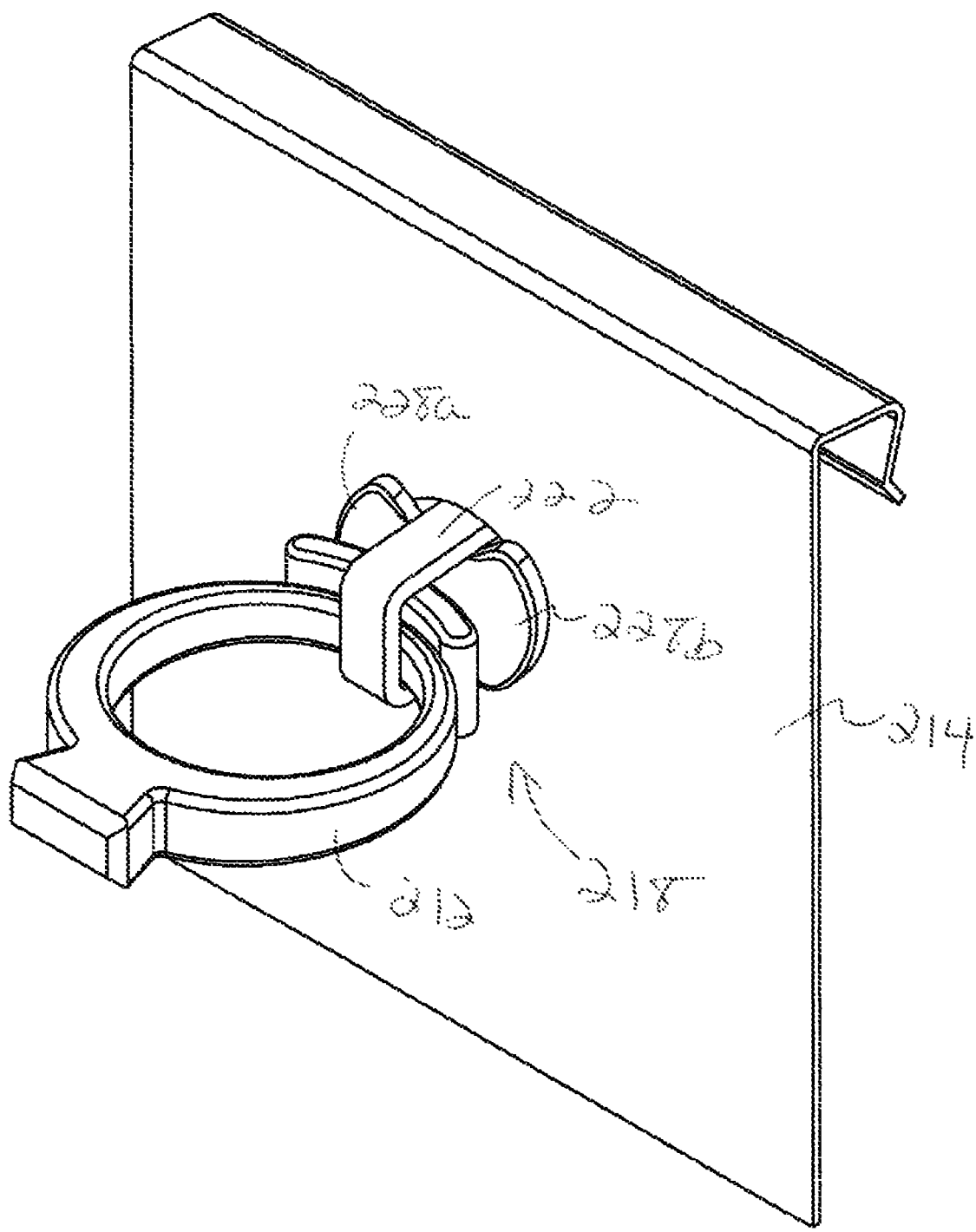
FIG. 39 is an enlarged, front perspective view of the anti-theft ring assembly of FIG. 32 fully assembled.

After the leading end of the tie is inserted into the trailing end, the tie is adjustable in one direction, to tighten the tie, as is known in the art. The tie is then tightened until the ring 212 is seated on the support member 218, and final tightening and cutting of the tie is then done by a cable gun, as described above with respect to FIGS. 1-21. Once the leading edge of the tie has been cut, the anti-theft ring assembly is complete (FIG. 38).

Figure 40:
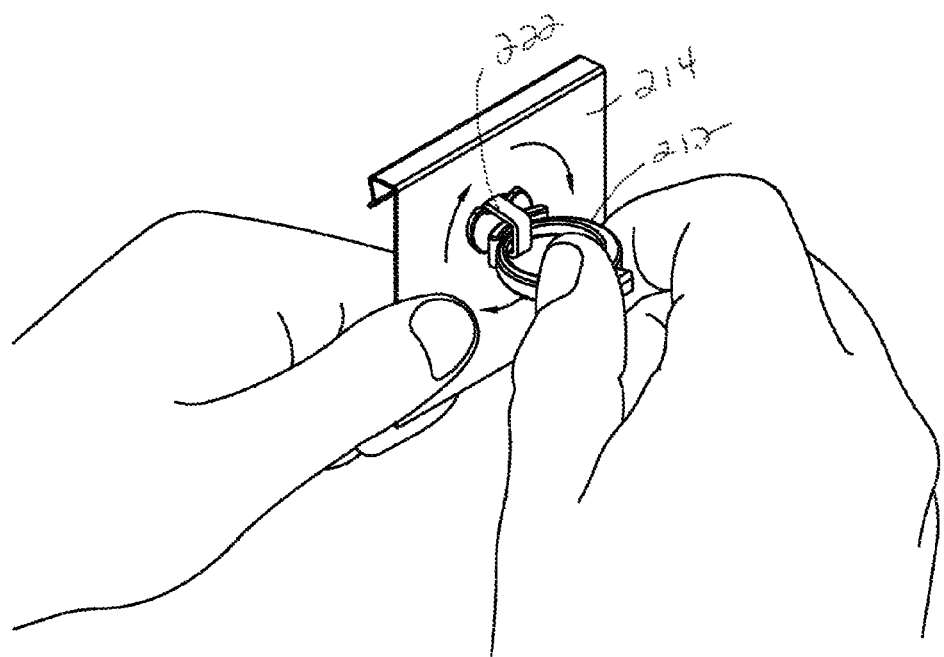
FIG. 40 is a front, perspective view of the anti-theft ring assembly of FIG. 32 fully assembled illustrating rotation of the ring assembly.
Figure 41:
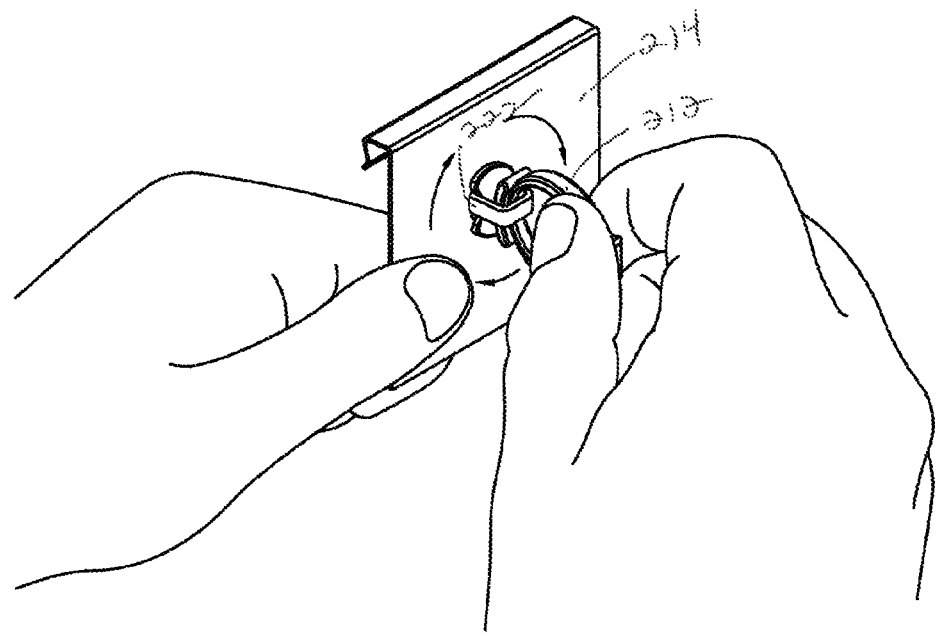
FIG. 41 is a front, perspective view of the anti-theft ring assembly of FIG. 32 fully assembled illustrating rotation of the ring assembly.

Referring now to FIGS. 40 and 41, if a consumer attempts to twist or turn ring 212 in an attempt to create torque sufficient to break tie 222, the engagement member 216 will simply rotate within opening 224 on card 214 and the ring 212 will remain attached thereto. In order for a consumer to remove the ring 212 from the engagement member 216, the tie 222 must be cut. To cut the tie 222, a conventional pair of scissors can be inserted within channel 241 (FIGS. 3-5).

Figure 29:
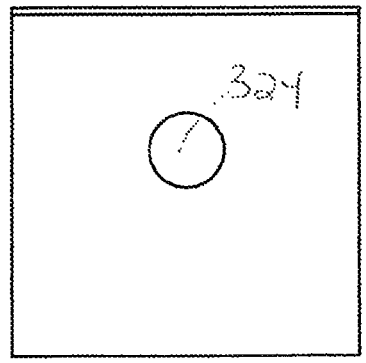
FIG. 29 is a front plan view of an alternate card for the anti-theft ring assembly according to the present disclosure.
Figure 30:
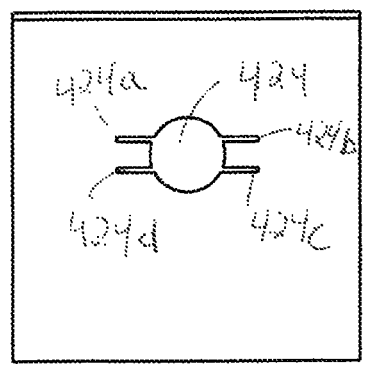
FIG. 30 is a front plan view of an alternate card for the anti-theft ring assembly according to the present disclosure.
Figure 31:
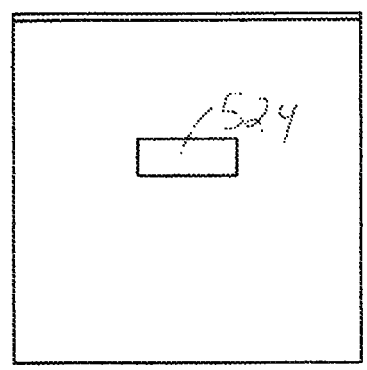
FIG. 31 is a front plan view of an alternate card for the anti-theft ring assembly according to the present disclosure.

Referring now to FIGS. 29-31 alternate embodiments for opening 24 are illustrated. As will be appreciated, the opening 24 can take any of a variety of configurations, provided that the engagement member can be inserted therein. FIG. 29 illustrates a substantially circular opening 324. FIG. 30 illustrates a substantially circular opening 424 with notches 424a, b, c, d. Finally, FIG. 31 illustrates a substantially rectangular opening 524.

It will be understood by those skilled in the art that various changes in form and details may be made therein without departing from the spirit and scope of the invention as defined by the appended claims. For example, the materials disclosed herein may be readily changed, as may the dimensions and geometric configurations. Also, the card may or may not be used with a display. The configuration of the openings for the card may also be changed, exemplary modifications including, but not limited to those illustrated in FIGS. 29-31. Therefore, the above description should not be construed as limiting, but merely as exemplifications of preferred embodiments. Those skilled in the art will envision other modifications within the scope, spirit and intent of the invention.

What is claimed is:

1. An anti-theft ring assembly comprising:
   a base including a first surface and an opposing second surface and having an opening disposed there through;
   an engagement member including:
   (a) a support member constructed and arranged to support a ring, at least a portion of the support member being sized larger than the opening, and
   (b) a locking member constructed and arranged to hold the support member on the base so as to allow rotation of the engagement member relative to the base, the locking member including a body and at least one leg extending from the body, the locking member being and constructed and arranged to be inserted into the opening in the base;
   and wherein during use the locking member prevents the engagement member from being pulled through the opening by a consumer.

2. The anti-theft ring assembly of claim 1, wherein upon applying a twisting force to the ring the engagement member rotates within the opening.

3. The anti-theft ring assembly of claim 1, wherein the at least one leg further includes a pair of legs constructed and arranged to be inserted through the opening.

4. The anti-theft ring assembly of claim 3, wherein the opening of the base includes a pair of notches configured and dimensioned to receive the pair of legs of the locking member.

5. The anti-theft ring assembly of claim 1, wherein the support member further includes a curved construction constructed and arranged to support a circular shank of the ring.

6. The anti-theft ring assembly of claim 5, wherein the curved construction of the support member is sufficient to prevent the ring from slipping off the support member.

7. The anti-theft ring assembly of claim 1, wherein the support member further includes an extension portion constructed and arranged to act as a stop.

8. The anti-theft ring assembly of claim 1, wherein the support member and locking member are single, unitary member.

9. The anti-theft ring assembly of claim 8, wherein the at least one leg further includes the pair of legs constructed and arranged to be inserted through the opening.

10. The anti-theft ring assembly of claim 9, wherein the opening of the base includes a pair of notches configured and dimensioned to receive the pair of legs of the locking member.

11. The anti-theft ring assembly of claim 10, wherein the base is a card constructed and arranged to be used with a display.

12. The anti-theft ring assembly of claim 11, further including an attachment member constructed and arranged to secure the ring to the support member.

13. The anti-theft ring assembly of claim 12, wherein the attachment member is flexible and tear resistant.

14. The anti-theft ring assembly of claim 13, wherein the attachment member is a strap.

15. The anti-theft ring assembly of claim 14, wherein the attachment member is a tie.

16. An anti-theft ring assembly comprising:
   a base including a first surface and an opposing second surface and having an opening disposed there through;
   an engagement member including a support member having a curved construction constructed and arranged to support a ring and at least a portion of which is sized larger than the opening, and a locking member constructed and arranged to hold the support member on the base so as to allow rotation of the engagement member relative to the base, the locking member including a body and at least one leg constructed and arranged to be inserted into the opening in the base;
   and wherein during use at least a portion of the support member rests against the first surface of the base, and at least a portion of the locking member rests against the second surface of the base and prevents the engagement member from being pulled through the opening, and wherein upon applying a twisting force to the ring the engagement member rotates within the opening.

17. The anti-theft ring assembly of claim 16, wherein the support member further includes a pair of legs constructed and arranged to be inserted through the opening.

18. The anti-theft ring assembly of claim 16, wherein the support member and the locking member are a single unitary member.

19. The anti-theft ring assembly of claim 16, further including an attachment member constructed and arranged to secure the ring to the support member.

20. The anti-theft ring assembly of claim 19, wherein the attachment member is flexible and tear resistant.

21. The anti-theft ring assembly of claim 20, wherein the attachment member is a strap.

\* \* \* \* \*